(12) United States Patent
Reynolds et al.

(10) Patent No.: US 7,733,891 B2
(45) Date of Patent: Jun. 8, 2010

(54) METHODS AND APPARATUS TO SUPPORT DYNAMIC ALLOCATION OF TRAFFIC MANAGEMENT RESOURCES IN A NETWORK ELEMENT

(75) Inventors: Scott Reynolds, Vancouver (CA); Siegfried Johannes Luft, Vancouver (CA)

(73) Assignee: Zeugma Systems Inc., Richmond (CA)

(*) Notice: Subject to any disclaimer, the term of this patent is extended or adjusted under 35 U.S.C. 154(b) by 893 days.

(21) Appl. No.: 11/224,275

(22) Filed: Sep. 12, 2005

(65) Prior Publication Data

US 2007/0061433 A1 Mar. 15, 2007

(51) Int. Cl.
*H04L 12/50* (2006.01)

(52) U.S. Cl. ..................................... 370/412

(58) Field of Classification Search .......... 370/229, 370/230, 230.1, 231–236, 238, 254, 351–360, 370/395.2, 395.3, 395.31, 395.32, 395.52
See application file for complete search history.

(56) References Cited

U.S. PATENT DOCUMENTS

| | | | |
|---|---|---|---|
| 4,720,850 A | 1/1988 | Oberlander et al. | |
| 4,893,302 A | 1/1990 | Hemmady et al. | |
| 6,262,974 B1 * | 7/2001 | Chevalier et al. | 370/232 |
| 6,320,863 B1 | 11/2001 | Ramfelt | |
| 6,587,470 B1 | 7/2003 | Elliot et al. | |
| 6,608,832 B2 | 8/2003 | Forslow | |
| 6,678,281 B1 | 1/2004 | Chakrabarti et al. | |
| 6,741,595 B2 | 5/2004 | Maher et al. | |
| 6,779,030 B1 | 8/2004 | Dugan et al. | |
| 6,789,116 B1 | 9/2004 | Sarkissian et al. | |
| 6,873,600 B1 | 3/2005 | Duffield et al. | |
| 6,920,109 B2 | 7/2005 | Yazaki et al. | |
| 6,948,003 B1 | 9/2005 | Newman et al. | |
| 6,961,539 B2 | 11/2005 | Schweinhart et al. | |
| 6,985,431 B1 | 1/2006 | Bass et al. | |

(Continued)

FOREIGN PATENT DOCUMENTS

CA  1 295 391  2/1992

(Continued)

OTHER PUBLICATIONS

PCT/CA2006/001414, PCT International Search Report and Written Opinion, Dec. 19, 2006.

(Continued)

*Primary Examiner*—Hanh Nguyen
*Assistant Examiner*—Juvena Loo
(74) *Attorney, Agent, or Firm*—Blakely Sokoloff Taylor & Zafman LLP

(57) ABSTRACT

Methods and apparatus to support dynamic allocation of traffic management resources in a network element. Shared pools of traffic management resources comprising an aggregation of local line card resources distributed across the line cards or a network element maintained by apparatus software. Incoming packets are classified into subscriber flows using a hierarchical classification scheme. In view of subscriber services and flow application types, traffic management resources are dynamically allocated from the shared pools, and traffic management policies associated with the subscriber services and application types are applied to the subscriber flows via the allocated resources. In response to detecting a subscriber flow has terminated, the allocated resources are release and made available to be dynamically re-allocated to subsequent subscriber flows.

32 Claims, 11 Drawing Sheets

U.S. PATENT DOCUMENTS

| | | | |
|---|---|---|---|
| 7,002,977 | B1 | 2/2006 | Jogalekar |
| 7,257,616 | B2 | 8/2007 | Bass et al. |
| 7,272,115 | B2 | 9/2007 | Maher, III et al. |
| 7,376,731 | B2 | 5/2008 | Khan et al. |
| 7,420,917 | B2 * | 9/2008 | Ishikawa et al. ............ 370/232 |
| 7,453,804 | B1 | 11/2008 | Feroz et al. |
| 7,492,713 | B1 | 2/2009 | Turner et al. |
| 7,496,661 | B1 | 2/2009 | Morford et al. |
| 2002/0016860 | A1 | 2/2002 | Garcia-Luna-Aceves et al. |
| 2002/0036983 | A1 | 3/2002 | Widegren et al. |
| 2002/0107908 | A1 | 8/2002 | Dharanikota |
| 2002/0116521 | A1 * | 8/2002 | Paul et al. .................... 709/233 |
| 2002/0122422 | A1 | 9/2002 | Kenney et al. |
| 2002/0122424 | A1 * | 9/2002 | Kawarai et al. ............. 370/394 |
| 2002/0181462 | A1 | 12/2002 | Surdila et al. |
| 2003/0005112 | A1 | 1/2003 | Krautkremer |
| 2003/0067903 | A1 | 4/2003 | Jorgensen |
| 2003/0081546 | A1 * | 5/2003 | Agrawal et al. ............. 370/229 |
| 2003/0108015 | A1 | 6/2003 | Li |
| 2003/0118029 | A1 * | 6/2003 | Maher et al. ........... 370/395.21 |
| 2003/0235209 | A1 | 12/2003 | Garg et al. |
| 2004/0013089 | A1 | 1/2004 | Taneja et al. |
| 2004/0028051 | A1 | 2/2004 | Etemadi et al. |
| 2004/0111461 | A1 | 6/2004 | Claudatos et al. |
| 2004/0248583 | A1 | 12/2004 | Satt et al. |
| 2005/0036512 | A1 | 2/2005 | Loukianov |
| 2005/0041584 | A1 | 2/2005 | Lau et al. |
| 2005/0068722 | A1 * | 3/2005 | Wei ............................ 361/686 |
| 2005/0100000 | A1 | 5/2005 | Faulkner et al. |
| 2006/0028982 | A1 | 2/2006 | Wright |
| 2006/0072451 | A1 | 4/2006 | Ross |
| 2006/0101159 | A1 | 5/2006 | Yeh et al. |
| 2006/0114832 | A1 | 6/2006 | Hamilton et al. |
| 2006/0140119 | A1 | 6/2006 | Yeh et al. |
| 2006/0140128 | A1 | 6/2006 | Chi et al. |
| 2006/0149841 | A1 | 7/2006 | Strub |

FOREIGN PATENT DOCUMENTS

| | | |
|---|---|---|
| CA | 2 276 526 A1 | 7/1998 |
| CA | 2 511 997 A1 | 8/2004 |
| EP | 1093266 A2 * | 4/2001 |
| WO | WO 99/30460 | 6/1999 |
| WO | WO 03/094449 A1 | 11/2003 |
| WO | WO2005/017707 A2 | 2/2005 |

OTHER PUBLICATIONS

PCT/CA2006/001423, PCT International Search Report and Written Opinion, Dec. 18, 2006.

PCT/CA2006/001469, PCT International Search Report and Written Opinion, Dec. 28, 2006.

Bodin, U., et al., "End-to-End QoS control architectures from a wholesale and retail perspective: benefits and challenges." [retrieved Apr. 19, 2007]. Retrieved from the Internet:www.operax.com. Operax, Tegeluddsvägen 92, SE-115 28, Stockholm, Sweden.

Gallon, C., et al., MSF Technical Report, MSF-TR-ARCH-005-FINAL. "Bandwidth Management in Next Generation Packet Networks." MultiService Forum. Aug. 2005.

Jungck, Peder, "Open Network Services Platforms for High-Value Network Services", [online], 2004 [retrieved Feb. 28, 2007]. Retrived from the Internet: CloudShield Technologies, Inc., www.cloudshield.com. CloudShield, 212 Gibraltar Drive, Sunnyvale, California 94089.

"Administrator, Developer and Partner Training Courses." [online] CloudShield Technologies, Inc., 2006 [retrieved Feb. 28, 2007]. Retrieved from the Internet: <URL: http://www.cloudshield.com/pdfs/training_course_Descriptions.pdf>.

"Arbor Peakflow SP on CS-2000: CloudShield and Arbor Networks Integrated Solution for DDoS Control." 2005. [retrieved Feb. 28, 2007]. Retrieved from the Internet: CloudShield Technologies, Inc., www.cloudshield.com. CloudShield, 212 Gibraltar Drive, Sunnyvale, California 94089.

"Bandwidth-on-Demand Solution." [retrieved Apr. 19, 2007]. Retrieved from the Internet: www.operax.com. Operax, Tegeluddsvägen 92, SE-115 28, Stockholm, Sweden. 2005.

"Broadband Architectures to Go Above and Beyond Triple Play." Sep. 2005. [retrieved Feb. 28, 2007]. Retrieved from the Internet: www.operax.com. Operax, Tegeluddsvägen 92, SE-115 28, Stockholm, Sweden.

"CloudShield Content Control Suite: Modular Software for Implementing Multi-Function Service Control." 2006. [retrieved Feb. 28, 2007]. Retrieved from the Internet: CloudShield Technologies, Inc., www.cloudshield.com. CloudShield, 212 Gibraltar Drive, Sunnyvale, California 94089.

"CloudShield Network Observatory: CS-2000 with $3^{rd}$ Party Applications Bring Network Content Into Focus." 2005. [retrieved Feb. 28, 2007]. Retrieved from the Internet: CloudShield Technologies, Inc., www.cloudshield.com. CloudShield, 212 Gibraltar Drive, Sunnyvale, California 94089.

"CloudShield PacketWorks IDE: Developers' Toolkit for CS-2000 In-Network Computing Platform." 2005. [retrieved Feb. 28, 2007]. Retrieved from the Internet: CloudShield Technologies, Inc., www.cloudshield.com. CloudShield, 212 Gibraltar Drive, Sunnyvale, California 94089.

"CS-2000 Content Processing Platform: Multi-Function Systems for Controlling and Securing Next Generation Services." 2006. [retrieved Feb. 28, 2007]. Retrieved from the Internet: CloudShield Technologies, Inc. www.cloudshield.com. CloudShield, 212 Gibraltar Drive, Sunnyvale, California 94089.

"Delivering Video over IP," Microsoft Corporation, 2003.

"Efficient Network Resource Control—A Source of Competitive Advantage." Sep. 2005. Operax, Tegeluddsvägen 92, SE-115 28, Stockholm, Sweden.

"Ellacoya Introduces VoIP Quality Reporter (VQR)." [online] Ellacoya Networks, Inc., 2007. [retrieved Apr. 19, 2007] Retrieved from the Internet: <URL: http://www.ellacoya.com/products/vgr.shtml>.

"Ellacoya Multimedia Service Manager (MSM) PacketCable Multimedia-based Application." [online] Ellacoya Networks, Inc., 2007. [retrieved Apr. 19, 2007] Retrieved from the Internet: <URL: http://www.ellacoya.com/products/multimediaMgr.shtml>.

"Ellacoya's Scalable Distributed Architecture." [online] Ellacoya Networks, Inc., 2007. [retrieved Apr. 19, 2007] Retrieved from the Internet: <URL:http://www.ellacoya.com/products/architecture.shtml>.

"Guarantee QoS for IPTV with Operax Bandwidth Manager." [retrieved Apr. 19, 2007]. Retrieved from the Internet: www.operax.com. Operax, Tegeluddsvägen 92, SE-115 28, Stockholm, Sweden. 2006.

"How IPv4 Multicasting Works," Microsoft TechNet, Microsoft Corporation, Mar. 28, 2003, pp. 1-32.

"How Unicast Ipv4 Routing Protocols and Services Work," Microsoft TechNet, Microsoft Corporation, Mar. 28, 2003, pp. 1-60.

"IMS and Operax Bandwidth Manager—Guaranteed QoS." [retrieved Apr. 19, 2007]. 2006. Retrieved from the Internet: www.operax.com. Operax, Tegeluddsvägen 92, SE-115 28, Stockholm, Sweden.

"Integrating Applications with the CloudShield ONSP." Aug. 2004. CloudShield Technologies, Inc., www.cloudshiled.com. CloudShield, 212 Gibraltar Drive, Sunnyvale, California 94089.

"Integrated Content Control for An All IP World." [retrieved Feb. 28, 2007]. Retrieved from the Internet: CloudShield Technologies, Inc., www.cloudshiled.com. CloudShield, 212 Gibraltar Drive, Sunnyvale, California 94089.

"IP Service Control System." 2005. [retrieved Apr. 19, 2007] Retrieved from the Internet: Ellacoya Networks, Inc., www.ellacoya.com. Ellacoya Networks, 7 Henry Clay Drive, Merrimack NH 03054 USA.

"Managed DDoS Security Services: An Arbor Networks/CloudShield Solution." Aug. 2004. CloudShield Technologies, Inc., www.cloudshield.com. CloudShield, 212 Gibraltar Drive, Sunnyvale, California 94089.

"Meeting the Multi-Service IP QoS Challenges." 2005. [retrieved Apr. 19, 2007]. Retrieved from the Internet: www.operax.com. Operax, Tegeluddsvägen 92, SE-115 28, Stockholm, Sweden.

"On the Road to IP Multi-Service." 2005. [retrieved Apr. 19, 2007]. Retrieved from the Internet: www.operax.com. Operax, Tegeluddsvägen 92, SE-115 28, Stockholm, Sweden.

"Operax Bandwidth Manager 5500: QoS control for the access, aggregation and edge." 2006. [retrieved Apr. 19, 2007]. Retrieved from the Internet: www.operax.com. Operax, Tegeluddsvägen 92, SE-115 28, Stockholm, Sweden.

"Operax Bandwidth Manager 5700: QoS control for IP/MPLS Networks." 2006. [retrieved Apr. 19, 2007]. Retrieved from the Internet: www.operax.com. Operax, Tegeluddsvägen 92, SE-115 28, Stockholm, Sweden.

"Operax guarantees QoS for Video Telephony: QoS guaranteed value added services."2005. [retrieved Apr. 19, 2007]. Retrieved from the Internet: www.operax.com. Operax, Tegeluddsvägen 92, SE-115 28, Stockholm, Sweden.

"Operax in IP Multimedia Subsystem (IMS): Advanced QoS control for IMS/NGN." 2006. [retrieved Apr. 19, 2007]. Retrieved from the Internet: www.operax.com. Operax, Tegeluddsvägen 92, SE-115 28, Stockholm, Sweden.

"Operax Triple Play: Service Control System." 2005. [retrieved Apr. 19, 2007]. Retrieved from the Internet: www.operax.com. Operax, Tegeluddsvägen 92, SE-115 28, Stockholm, Sweden.

"Prolexic DNS Shield on CS-2000: Prolexic and CloudShield Integrated Solution for DNS Service Protection." 2005. [retrieved Feb. 28, 2007]. Retrieved from the Internet: CloudShield Technologies, Inc., www.cloudshield.com. CloudShield, 212 Gibraltar Drive, Sunnyvale, California 94089.

"A Unified Policy Management Framework: IP Service Creation and Assurance in Converged Networks." Nov. 2006. Operax, Tegeluddsvägen 92, SE-115 28, Stockholm, Sweden.

"What is Unicast IPv4 Routing?" Microsoft TechNet, Microsoft Corporation, Mar. 28, 2003, pp. 1-6.

PCT/CA2006/000555, PCT International Search Report and Written Opinion, Jul. 26, 2006.

PCT/CA2006/000554, PCT International Search Report and Written Opinion, Aug. 1, 2006.

* cited by examiner

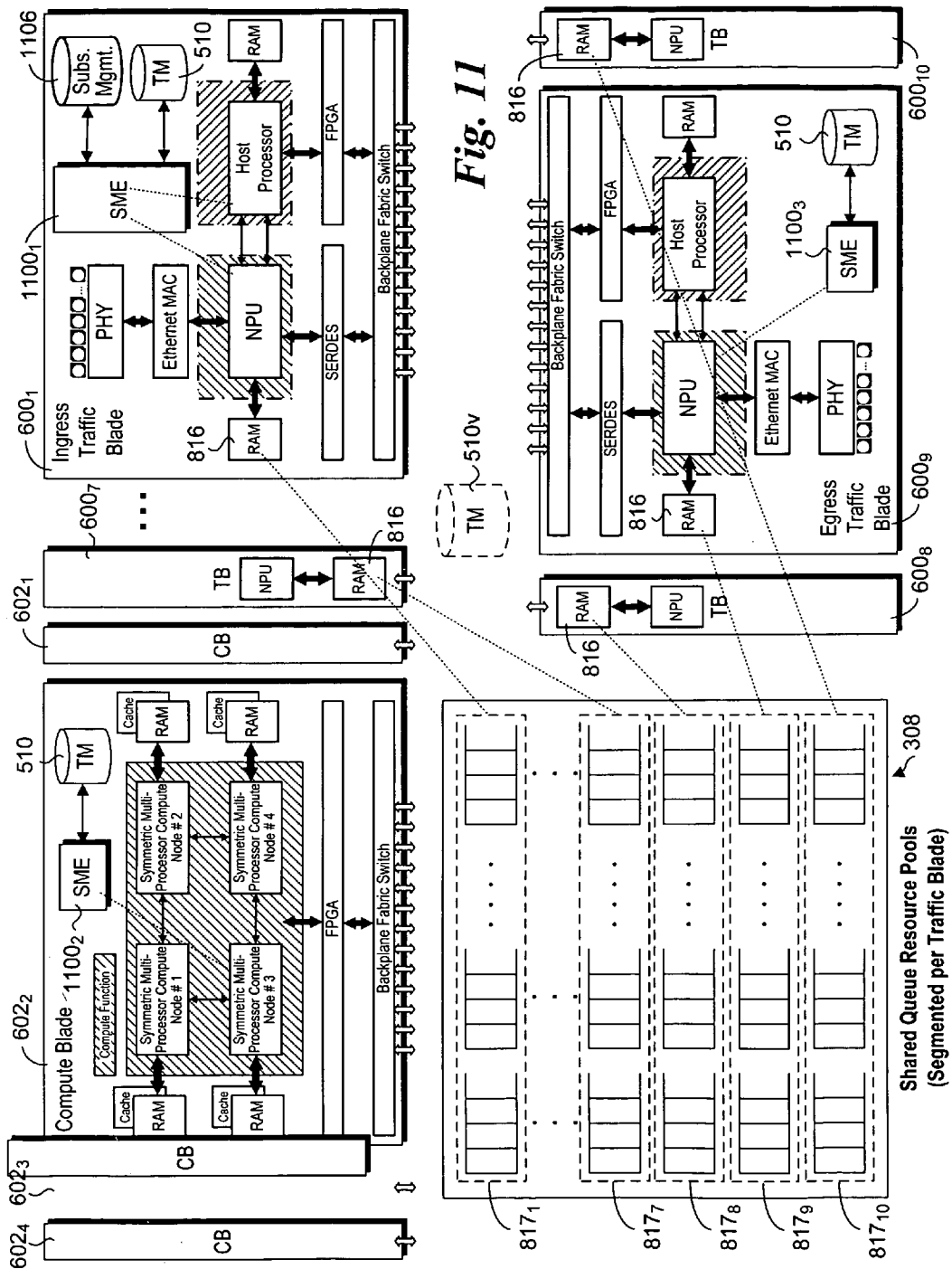

METHODS AND APPARATUS TO SUPPORT DYNAMIC ALLOCATION OF TRAFFIC MANAGEMENT RESOURCES IN A NETWORK ELEMENT

FIELD OF THE INVENTION

The field of invention relates generally to congestion and flow control in converged full service communication systems, and, more specifically but not exclusively relates to employing dynamic allocation of traffic management resources including queues and compute resources to support enhanced services and traffic management capabilities in a network element.

BACKGROUND INFORMATION

Incumbent telecommunication providers are using the capabilities of existing and next generation residential high-speed broadband connections to deliver services other than high-speed Internet (HSI) access. These new services include voice (utilizing Voice over IP technology) and streaming video. Such services may be offered at a price premium over and above the existing HSI access, improving the revenue generating capability of providers' network.

Delivering streaming content (e.g. voice and video) requires specialized processing/treatment by the network to ensure acceptable service quality for these new applications. This specialized processing typically involves a Network Element (NE) identifying both the subscriber and the streaming media content and a) ensuring there exists sufficient bandwidth to accept the new service request; b) expediting the delivery of the content; and c) protecting the premium content from unregulated, greedy protocols and applications. Collectively, these functions can be aggregated into an "admission control" element and a "traffic management" element.

Admission control is responsible for identifying the service request and determining whether sufficient network resources exist to allow the request and honor the required quality guarantees. Admission control can be explicit, through techniques such as a signaling protocol (e.g. RSVP, SIP etc) or implicit, by dynamically identifying the service/application in real-time.

Traffic management (TM) is an umbrella term used to describe the allocation of network resources to competing services. It typically includes functions such as traffic queuing and servicing, traffic rate policing and shaping. Traffic management functions can be applied at various levels of granularity—ranging from traffic from individual applications and subscribers, to aggregates that contain traffic of similar classes from hundreds or thousands of users. Depending on the dynamic nature of the network's load, a NE may dynamically manage TM properties in real-time or merely statically provision the TM properties in response to results from the admission control element. A traffic manager implements a resource allocation scheme based on both an implied hierarchy of importance of service types and a model of the current resource availability and allocation. As new service requests are processed, network resources may be allocated or re-allocated, taken from lower priority flows and given to higher priority requests.

Traffic management functions control the bandwidth, packet loss probability, delay and delay variation (jitter) for a given flow of (in this case) IP datagrams (also referred to herein as "packets"). Each service may require a unique combination of these parameters to deliver acceptable service quality, and each service request forces a re-evaluation of the resource allocation policy, potentially re-allocating the resources amongst all the competing flows.

Implicit to both admission control and traffic management is the process of traffic classification. Classification is the process of matching incoming traffic against a database of signatures in order to identify some descriptive property of the traffic—such as who the traffic is from (for subscriber identification) or what type of traffic is being transmitted (service type classification for traffic management). Classification is a necessary and critical component of both admission control and traffic management elements described above.

FIG. 1 depicts a typical topology for a high-speed broadband network. At the service end, services such as video, voice, and Internet access are provided to subscribers 100 via an interface to an access network 102, such as a cable or DSL (Digital Subscription Line) modem 104 and a router 106. Meanwhile, access network 100 is coupled to an aggregation network 108 via appropriate network elements, such as DSLAMs (Digital Subscription Line Access Multiplexer) 110 and 112 and CMTS (Cable Modem Termination System) element 114. An IP network element (NE) 116 is used to couple aggregation network 108 to networks from which the services (typically) originate, such as a service provider network 118 and the Internet 120 and provide various subscriber services. Service provider network 118 and Internet 120 are commonly referred to as "core" networks.

The IP Network Element in existing networks generally will be one of either a Broadband Remote Access Server (BRAS) or an Edge Router (ER). Typical reference architectures use a BRAS for residential broadband deployments and ERs to provide business leased-line and single ended services, such as Internet access. Table 1 below summarizes the architectural differences between a BRAS, an ER, and proposed next-generation NEs, with the focus on traffic management capabilities.

TABLE 1

| Function | BRAS | ER | Next Generation |
| --- | --- | --- | --- |
| Application | Residential broadband networks | Business leased line | Residential broadband Multi-service networks |
| Subscriber facing interfaces | ATM, Ethernet | PDH (DS1, T3), Ethernet | Gigabit Ethernet |
| Trunk/core facing interfaces | Ethernet, POS, Gigabit Ethernet | Ethernet, POS, Gigabit Ethernet | 10 Gigabit Ethernet |
| Subscriber/customer identification | Tunnels (PPPoA, PPPoE) | Physical ports, timeslot or Layer 2 technique (e.g. VLAN, VPI/VCI, DLCI etc) | DHCP |
| Traffic type | Not Applicable | L2: VLAN/802.1p, | L2 + L3 + L4 + application |

TABLE 1-continued

| Function | BRAS | ER | Next Generation |
|---|---|---|---|
| identification | | VPI/VCI<br>L3: DSCP/TOS<br>L4: Socket | |
| Traffic Management focus | Managing subscriber traffic (virtual stream) | Managing port and/or CoS traffic per port | Managing service traffic per subscriber |
| Traffic Management granularity | Fine: 1000's small pipes | Coarse: 100's fatter pipes | Fine: 10,000's queue, supporting both thin and fat pipes |
| Queues | 1000's, per subscriber | Smaller: ports × Cos | 100,000's, per subscriber × service |
| Queue allocation policy | Fixed-per subscriber | Fixed-CoS based | ? ←Innovation required |
| TM sophistication | Limited-ensure fair allocation of bandwidth between subscriber | More sophisticated-ensure prioritization per port | Sophisticated-ensure service quality with a subscriber and service category |

As broadband residential access networks evolve to deliver services other than HSI, the capabilities of the BRAS must extend to match. Similarly, ERs currently do not have the TM capabilities to handle thousands of subscribers, each demanding their own set of service queues. These evolving requirements are captured in the next generation column of Table 1.

From Table 1, it is clear that the area of TM requires the most significant changes. Typically BRAS devices lack the sophisticated service-aware traffic management functions to provide dedicated queues per service, per subscriber. Secondly, the requirement to have a dedicated queue per subscriber, irrespective of whether the subscriber is on-line and using the service fundamentally limits the number of subscribers an NE can provide.

The ER approaches the problem differently. If only a small number of queues per interface are supported, an aggregate queuing model must be employed. In this model, all service-specific traffic (e.g. all voice traffic destined to all subscribers) is funneled or aggregated through a single service specific queue. The number of queues required is thus limited to the number of discrete services supported by the network per port.

This model can only control the behavior of the aggregate queue (i.e. ensuring the aggregate bandwidth, aggregate packet loss, aggregate delay and jitter are sufficient), rather than the behavior of the constituent subscriber service flows. In this case, it is entirely possible (and likely) that although the aggregate quality of service is being meet, the quality of service for the individual subscriber service flows may not be satisfied.

SUMMARY OF THE INVENTION

In accordance with aspects of the present invention, methods and apparatus to support dynamic allocation of traffic management resources in a network element are disclosed. Shared pools of traffic management resources are maintained by distributed software entities running on the blades (i.e., line cards) of a network element. The shared pools comprise an aggregation of local resources hosted by the various blades, and include queues and packet processing resources. Incoming packets are classified into subscriber flows using a hierarchical classification scheme. In view of subscriber services and flow application types, traffic management resources are dynamically allocated from the shared pools, and traffic management policies associated with the subscriber services and application types are applied to the subscriber flows via the allocated resources. In response to detecting a subscriber flow has terminated, the allocated resources are released and made available to be dynamically re-allocated to subsequent subscriber flows.

In another aspect of the present invention, architectures for implementing the method on a network element are disclosed. The architecture includes a plurality of traffic blades and compute blades, each having local processing and memory resources. The traffic blades are used for performing ingress and egress operations, while the compute blades are employed for traffic analysis and other management operations. A distributed set of software components are run on various processor resources on the blades, and cooperatively implement various packet processing operations associated with the methods.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 11 is a schematic diagram of an exemplary execution environment for a service node shared.

DETAILED DESCRIPTION

Embodiments of methods and apparatus for supporting dynamic allocation of traffic management resources in network elements are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the term "coupled," along with its derivatives, is used. "Coupled" may mean that two or more elements are in direct physical or electrical contact. However, "coupled" may also mean that two or more elements are not in direct contact with each other, but yet still co-operate or interact with each other.

The embodiments described herein address the limitations of the prior art by using statistical properties of the traffic and subscribers to share a (relatively) small set of queue resources. The embodiments combine the use of several technologies, such as deep packet inspection-based classification and high performance computing to identify both the subscribers and their service requests and dynamically provision a traffic management queue and associated compute resources for the duration of the service delivery. By dynamically allocating resources from shared pools, rather than statically provisioning them, far greater subscribers can be supported per network element, without increasing the queuing or traffic management system complexity.

In order to more clearly understand aspects of the invention, a generalized implementation of the aspects will first be discussed. Following this, details of implementing the techniques on an exemplary implementation environment are then discussed.

Figure 1:
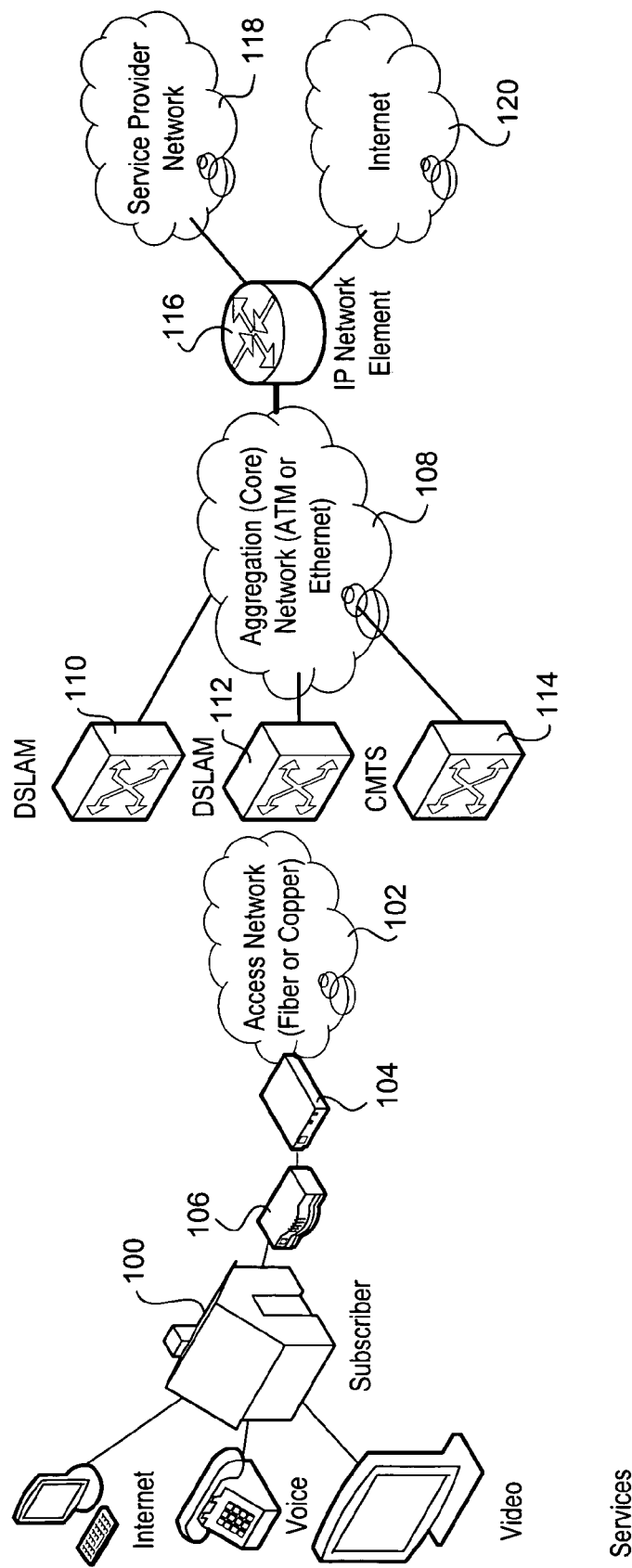
FIG. 1 is a schematic diagram of a conventional high-speed broadband network topology.
Figure 2:
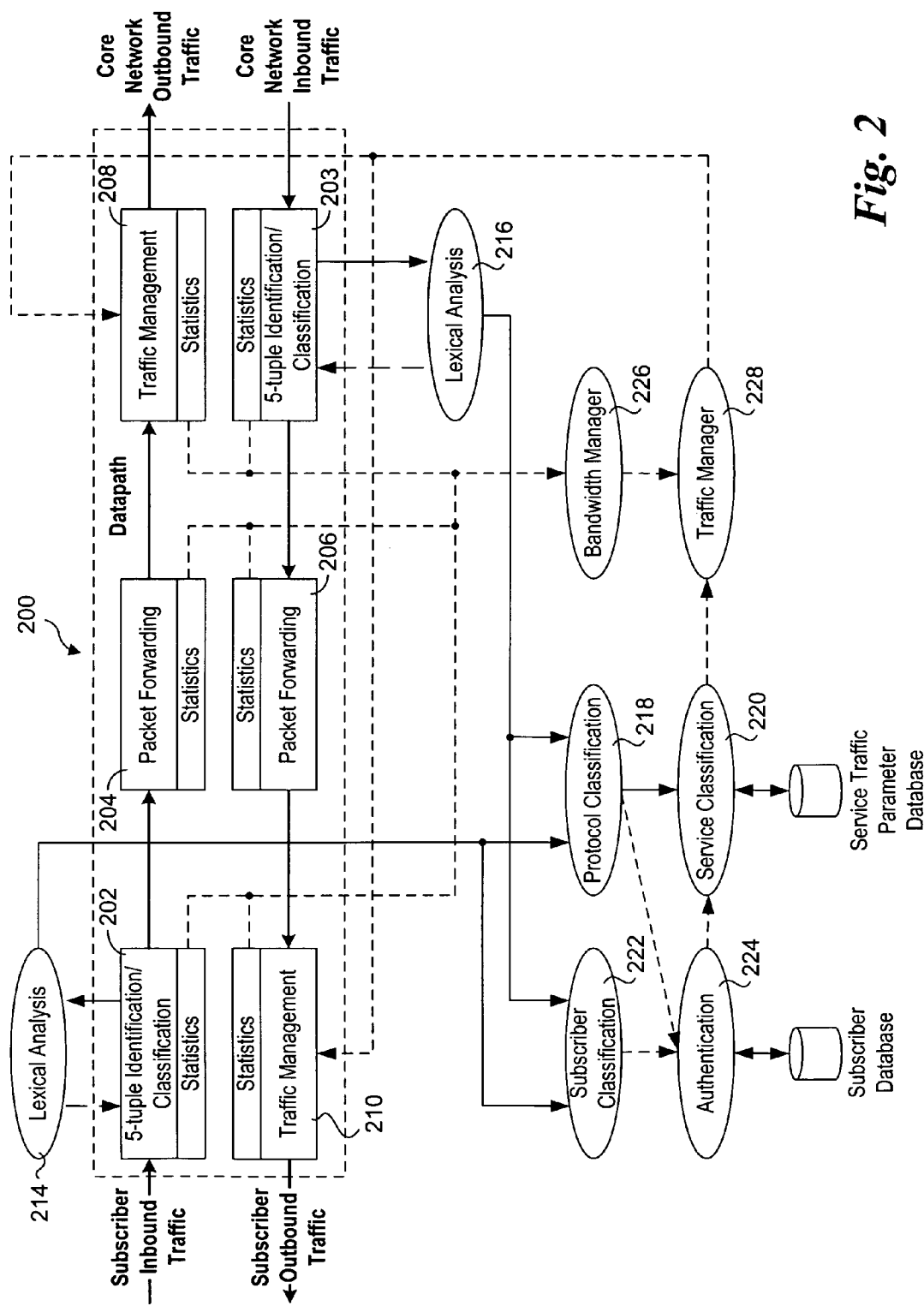
FIG. 2 is a schematic diagram of a system architecture used to implement a multi-level classification hierarchy mechanism, according to one embodiment of the invention.

FIG. 2 illustrates components implemented as part of a packet processing datapath 200 on a network element referred to herein as the "Service Node." The datapath includes 5-tuple packet identifiers/classifiers, IP packet forwarders, traffic management elements and the respective statistic gathering components. These components are schematically depicted in FIG. 2 by corresponding functional blocks, which include 5-tuple identification/classification blocks 202 and 203, packet forwarding blocks 204 and 206, and traffic management blocks 208 and 210.

In one implementation of the Service Node (described below), the packet processing datapath is implemented within the bounds of a Network Processor unit (NPU). The packet processing datapath has a strict processing budget bounded by the maximum inter-arrival rate of the incoming packets (i.e., the line rate of the NE). This processing budget fundamentally limits the amount of packet processing that can be performed while still meeting the line rate performance targets.

The amount of packet processing performed by the datapath is sometimes not sufficient to fully resolve the type of packet, the source of the packet, or how to process the packet. Accordingly, a second series of components shown in FIG. 2 illustrate a number of enhanced packet classification processes (including lexical analysis 214 and 216, protocol classification 218 and service classification 220), admission control processes (including subscriber classification 222 and authentication 224) and dynamic packet processing processes (including bandwidth management performed by a bandwidth manager 226 and traffic management performed by a traffic manager 228). In one embodiment of the Service Node architecture, these processes are implemented on high performance generalized compute resources.

FIG. 2 illustrates IP datagram dataflow using solid lines. The basic dataflow consists of IP datagrams (packets) ingressing from the Subscriber Inbound Traffic interface, through 5-tuple identification/classification block 202, through packet forwarding block 204 and traffic management block 208 out the Core Network Outbound Traffic Interface. Since most IP sessions (TCP and UDP) involve the bi-directional flow of datagrams between a client and a server, traffic entering from the Core Network Inbound interface follows a symmetric path, which includes 5-tuple identification/classification block 203, packet forwarding block 206 and traffic management block 210.

Due to the complexities of packet classification, a packet classification hierarchy is implemented, as more fully discussed below. Each higher level of the classification hierarchy performs more complex packet analysis on a sub-sample of the packets that constitute a flow. A secondary datapath, called the "Bifurcated" datapath, duplicates packets matching specific 5-tuple filters to the higher layers of the classification hierarchy. Bifurcation offers the advantage of presenting the packet to the detailed classification and analysis algorithms while not introducing undue latency into the basic datapath. Furthermore, since only a subset of the entire packet traffic is bifurcated, significantly more detailed and arbitrarily complex analysis algorithms are possible while still maintaining the performance requirements of the sub-sampled bifurcated packet stream.

Traditionally, the rules for classifying a message (i.e., one or more associated packets) are called filters (or rules in firewall terminology), and the packet classification problem is to determine the lowest cost matching filter or rule for each incoming message at the network element. Under the well-known N-tuple classification scheme, the relevant information is contained in N distinct headerfields (or partial header fields) in each packet.

The corresponding filter database consists of a finite set of filters, $filt_1$, $filt_2$ ... $filt_N$. Each filter is a combination of N values, one for each header field. Each field in a filter is allowed three kinds of matches: exact match, prefix match, or range match and wildcard. In an exact match, the header field of the packet should exactly match the filter field. In a prefix match, the filter field should be a prefix of the header field. In a range match or wildcard match, the header values should lie in the range specified by the filter (or be any value for a wildcard match). Each filter $filt_i$ has an associated directive $disp_i$, which specifies how to process a packet matching the filter.

Under the 5-tuple identification/classification scheme employed by 5-tuple identification/classification blocks 202 and 203, the relevant fields for an IPv4 packet comprise the Destination Address (32 bits), the Source Address (32 bits), the Destination Port (16 bits), the Source Port (16 bits), and the Protocol Field (layer 4 protocol type—8 bits); the set of field values for a given packet is referred to as the 5-tuple signature. This L3/L4 classifier supports exact match, prefix match, ranges and wildcards on each of the search key elements. The 5-tuple identifier/classifier provides bounded search latency, and hence is performance-independent of packet length, making it suitable for inclusion into datapath 200.

As discussed above, packet forwarding blocks 204 and 206 perform packet forwarding operations. The element is common to all NEs that forward IP datagrams, and its operations are well-known in the art and beyond the scope of the present invention. At a minimum, the packet forwarding involves searching a table of IP address prefixes using the incoming packet's destination IP address. The result of the search is an entry in an IP adjacency table, indicating the correct egress link for the datagram to be forwarded.

Traffic Management blocks 208 and 210 implement traffic management functions such as traffic rate limiting (policing), queuing, queue servicing, queue congestion control and traffic rate shaping. The queues contained in this block are statistically multiplexed between different subscribers and their traffic based on usage requirements. Traffic Management blocks 208 and 210 are controlled by means of Traffic Manager 228 as described below.

Figure 3:
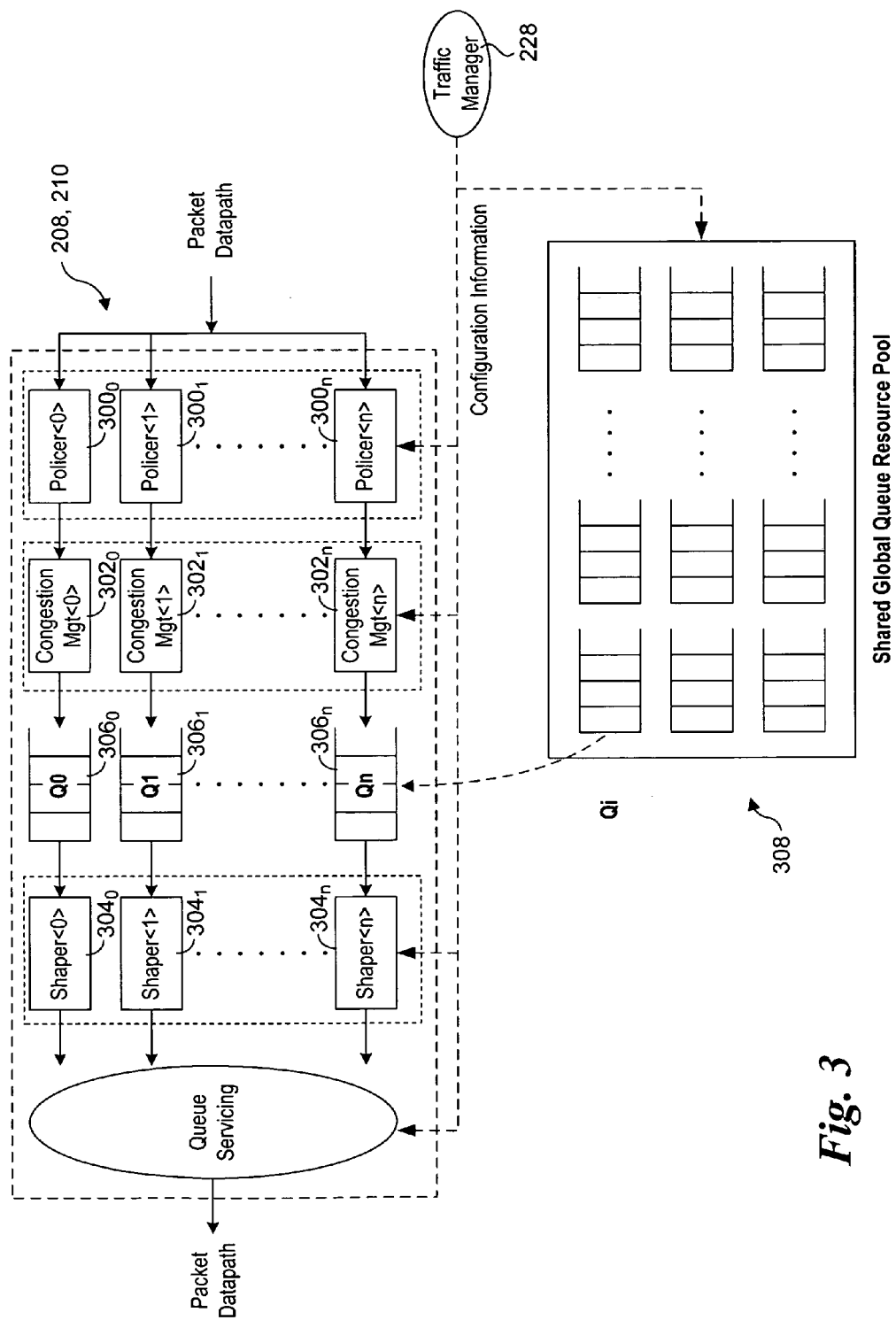
FIG. 3 is a schematic diagram illustrating further details of the Traffic Manager element of FIG. 2.

An exemplary implementation scheme illustrating further details of operations performed by one embodiment of the Service Node are shown is shown in FIG. 3. As packets arrive at a Traffic Management block (208 or 210), they will have been already classified into corresponding subscriber service and/or application flows. A set of Traffic Management policies and operations are applicable to each flow classification. This is illustrated by a set of Policer blocks $300_{0-n}$, a set of Congestion Management blocks $302_{0-n}$, and a set of (Traffic) Shaper blocks $304_{0-n}$.

Each Policer block performs policing operations, such as traffic rate limiting, in view of policing policies applicable to the associated flow. Similarly, each Congestion Management block performs congestion management operations based on applicable congestion management policies for the associated flow, and each Traffic Shaper block performs traffic shaping operations in view of traffic shaping policies for the associated flow. For example, the respective operations performed for a flow classified to flow 1 includes operations performed by Policer block $300_1$, Congestion Management block $302_1$, and Traffic Shaper block $304_1$.

Another aspect of traffic management operations relates to dynamic queue allocation and management. As described below in further detail, Traffic Manager 228 dynamically allocates queues $306_{0-n}$ for respective flows 0-n from a shared queue resource pool 308. In connection with queue allocation, each Traffic Management block also performs queue servicing 310. In one Service Node implementation, each of Traffic Management blocks 208 and 210 is capable of supporting 64,000 queues, each individually serviced with a hybrid priority/weighted round robin queue service discipline, 1 M dual-rate token bucket Policers, and over 1K independent shapers. Other numbers of queues, policers, and shapers may also be implemented in a similar manner.

5-tuple identification/classification blocks 202 and 203 are capable of matching the packet against basic layer 3 and layer 4 information. In some instances this is not sufficient to identify the actual application payload or the subscriber (e.g., due to the use of tunnels and/or NAT (Network Address Translation)). The Service Node employs a unique classification. hierarchy architecture, where packets determined to be of interest at a given layer of the hierarchy are presented to a subsequent layer for further processing. If a packet can be fully resolved at a given layer, it does not need to be promoted to the next higher layer, resulting in a decreasing number of packets processed at subsequently layers. This lower packet processing rate requirement allows more complex (and hence time-consuming) processing algorithms to be employed while still maintaining the fundamental performance targets.

Figure 4:
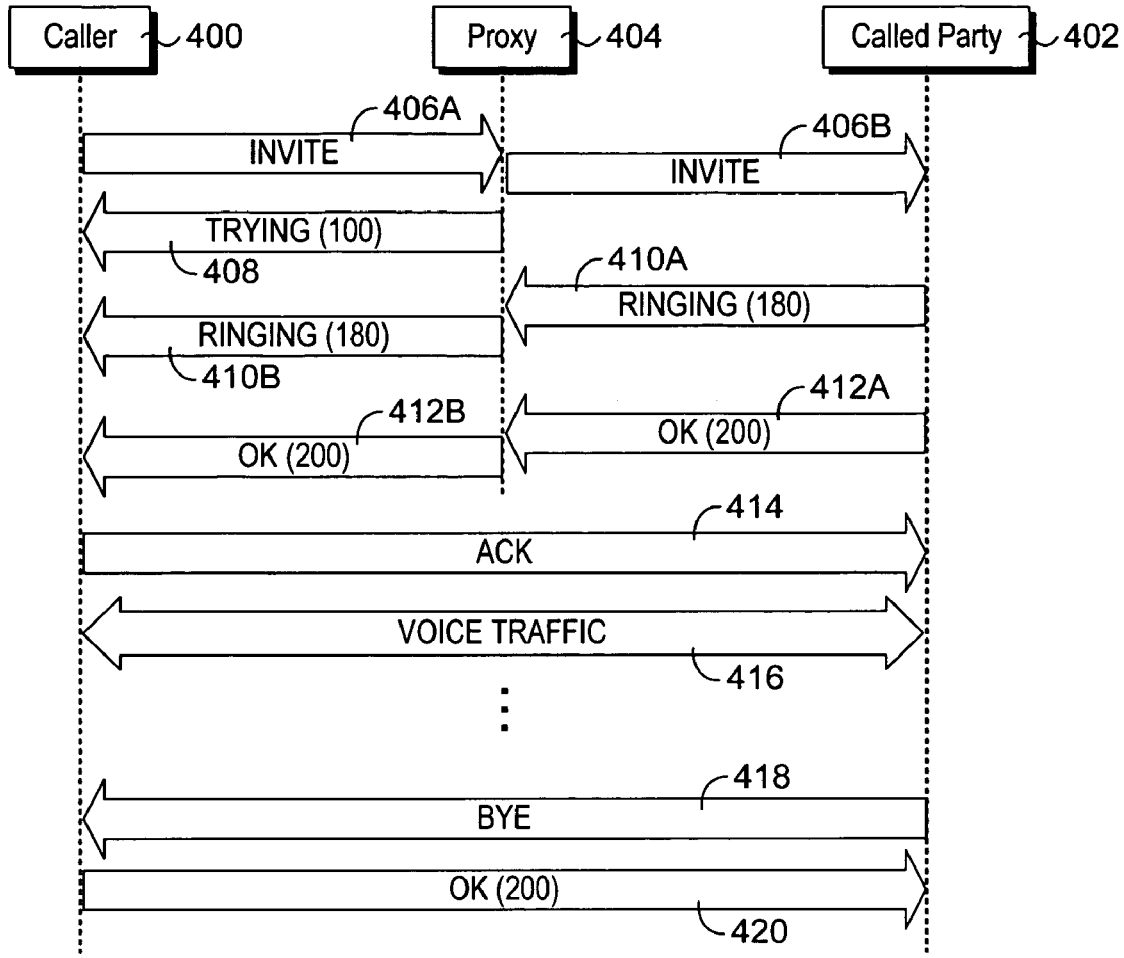
FIG. 4 is a message flow diagram illustrating an exemplary protocol exchange performed during a typical VoIP session.

By way of example and not limitation, differing aspects of the classification hierarchy are illustrated with reference to the SIP (Session Initiation Protocol) protocol exchange of FIG. 4. In accordance with this VoIP example, a caller 400 employs the SIP protocol to establish a connection (i.e., communication session) with a called party 402 via proxy services provided by a proxy 404. In consideration of the foregoing diagrams, messages sent from caller 400 comprise subscriber inbound traffic, while message sent from called party 402 represent core network inbound traffic.

To initiate the session, the caller sends a SIP call INVITE message 406A to proxy 404, which forwards the message as INVITE message 406B to called party 402. In response to INVITE message 406A, proxy 404 returns a TRYING message 408 to caller 400 containing a response code 100. Upon receipt of INVITE message 406B, called party 402 returns a RINGING message 410A to proxy 404 containing a response code 180, which forwards a corresponding RINGING message 410B to caller 400. In response to establishing a connection, called party sends an OK message 412A containing a response code 200 to proxy 404, which forwards a corresponding OK message 412B to caller 400. In response, caller 400 sends an ACKnowledge message 414 directly to called party 402.

At this point, the point-to-point connection is established, enabling bi-direction voice traffic 416 to be transmitted between caller 400 and called party 402. At the conclusion of the call session, called party 402 sends a BYE message 418 to caller 400, which returns an OK message 420.

Now let's consider how this SIP exchange is handled from the viewpoint of the classification hierarchy. The initial SIP call INVITE message 406A may typically be encapsulated in a TCP packet. The 5-tuple identifier/classifier will perform a primary (i.e., first-level) classification of the packet using its 5-tuple signature. Based on the signature, the 5-tuple identifier/classifier will identify the packet as containing TCP and including a destination port that matches a well-known port number that is used for the SIP protocol. From a conceptual viewpoint, this first-level classification provides a filtering function that filters out packets matching a first-level set of rules.

At this point, the classification process is passed to a next level in the hierarchy that performs further filtering operations. In conjunction with the architecture of FIG. 2, this filtering is performed by lexical analysis block 214. In further detail, the block performs a lexical analysis of the packet by performing a byte-wise regular expression search of the packet including the payload, searching for detailed protocol signatures. This analysis is also referred to as "Deep Packet Inspection." For example, for the instance SIP call INVITE message, the lexical classifier will parse the packet payload confirming that the packet is indeed SIP, and contains a call INVITE message. This level of packet processing classification can only be definitively obtained by searching the packet payload, since the packet header data alone is not definitive of the message type. Packets matching certain configured lexical rules may then be forwarded to the Protocol Classifier (i.e., Protocol Classification 218) for further analysis. In some cases, the result of the lexical analysis will result in updated filter rules being installed into the 5-tuple classifier. For example, as a result of detecting a SIP session open request, the 5-tuple classifier may be configured to look for the ACK message 414, which is the next message sent from caller 400.

The protocol classifier (i.e., protocol classification 218) contains protocol state knowledge for each configured protocol. For example, the SIP protocol classifier understands that a SIP INVITE is typically followed by a 100 TRYING or a 180 RINGING message. The protocol classifier follows the complete protocol exchange between the two connected parties, storing stateful information to identify the present and past states of the exchange. Once the connection is established, it notifies the Service Classifier to initiate Service Classification 220.

Service Classification 220 is responsible for identifying services, which are a conglomeration of protocols. For example, within a VoIP call, SIP over TCP is used for the signaling traffic while the voice traffic is encapsulated into RTP over UDP. A service is therefore defined as a collection of inter-related protocols. The service classifier uses inputs from the protocol classifiers to determine what service is being requested. Assuming the subscriber is authorized to use the particular service, it then consults a database that contains traffic management parameters specific to that service and subscriber.

Subscriber Classification 222 is responsible for examining the packet and determining the subscriber from which the packet came. In some cases, this may be a matter of consulting a database of IP addresses and subscribers, or it may be more detailed matter of terminating tunnels such as PPPoE (Point-to-Point Protocol over Ethernet).

Authentication 224 comprises the process of validating the identified subscriber's credentials against a known entry in the database. It may include password authentication or service authentication (e.g., is this subscriber allowed to use the VoIP service?). This may be performed at the network element, or using an external element, such as a AAA (Authentication, Authorization and Accounting) server.

The Bandwidth Manager 226 performs a process responsible for maintaining an empirical model of the current bandwidth of the subscriber facing connection. In the Service Node model, the customer-facing interface represents the point of most congestion (i.e. may be the most bandwidth constrained depending on the services and applications currently running over the connection). The Bandwidth Manager collects statistics on the customer facing connection and maintains a maximum link capacity (goodput) and current link utilization. The conventional model of available bandwidth is then the difference between the link capacity and its current utilization. The Service Node extends this conventional view with allowing higher priority services to expropriate bandwidth from lower priority services/applications currently in use. This is one of the functions of Traffic Manager 228.

The Traffic Manager is responsible for determining whether there are sufficient resources available for a newly requested service and if so, to (re-)allocate those resources to ensure that the service guarantees can be met. The Traffic Manager accepts the service quality requirements from the service classification process, and the current state of the customer-facing link and dynamically configures the Traffic Management elements of the datapath.

Operational Description

Figure 5:
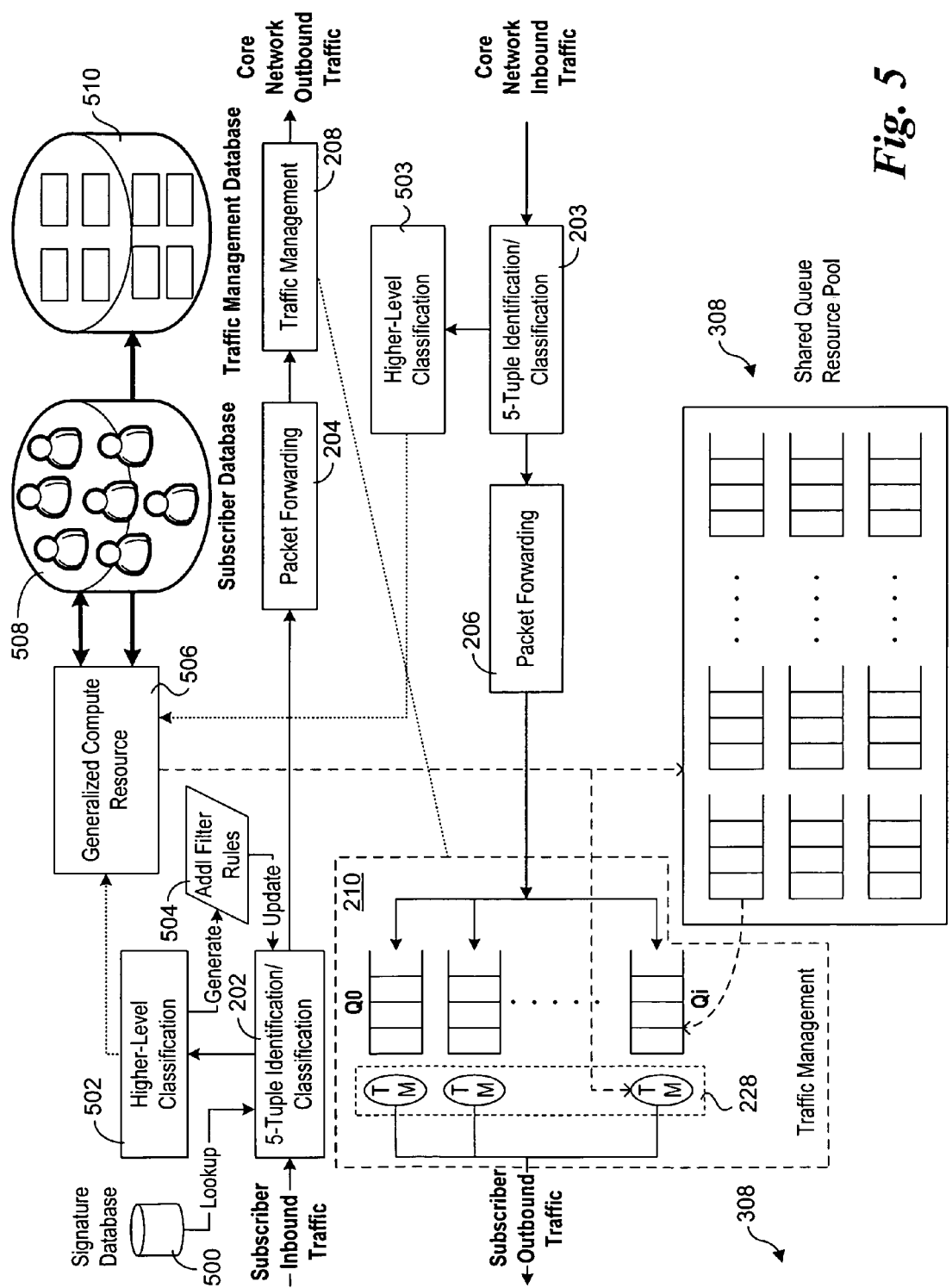
FIG. 5 is a schematic flow diagram illustrating various operations performed during processing and forwarding of inbound and outbound subscriber traffic.

With reference to FIG. 5, an exemplary packet processing flow proceeds in the following manner. Packets received from the subscriber interfaces (depicted as Subscriber Inbound Traffic) are processed by 5-tuple identification/classification block 202. This block is provided access to pre-established (although capable of being run-time updated) signature database 500 containing common protocol signatures. Use of these protocols is an indicator of a use of a service. Initially, packets matching one of the pre-established protocol signatures are bifurcated to higher layers of the classification hierarchy, as depicted by the flow into higher-level classification blocks 502 and 503. During the period where the packet is only partially classified, subscriber authentication or service identification has been not been completed, and packets can be thought of only matching a "default" or best effort service class, receiving no prioritization or other special treatment as they flow through the Service Node.

As the service classification progresses through the stages of service initiation, additional filter rules 504 (which may be more specific in nature) are driven down to the 5-tuple identifier/classifier. By reducing the scope of the filtering performed at lower layers of the classification, the burden of processing extraneous packets by the higher layers is removed.

Once a subscriber is authenticated and the service identified, Traffic Manager 228 makes an implicit admission control decision as to whether sufficient network resources exist to accept and successful delivery the newly requested service. Assuming that the service is being allowed, the Traffic Manager will allocate a queue from shared queue resource pool 308. This will be the queue that holds (i.e., buffers) the subsequent packets from this flow. Traffic Manager 228 configures the parameters of the traffic management functions for that queue based on the parameters provided by the service database. These traffic management functions typically include:

1) Acceptable temporal profile (traffic rate limiting or policing), with actions to be performed if the profile is exceeded.
2) Congestion management parameters, for example packet discard probabilities if Random Earlier Detect (RED) or Weighted RED is used.
3) Desired service rate (traffic shaping)
4) Queuing service discipline (priority, weighted servicing, work conserving etc).

Packet rate limiting measures the packets arrival rate against a per-determined temporal profile. Packets exceeding this profile may be discarded (or in some way marked) before being queued. Assuming the packet is queued, depending on the service rate of the queue, the queue depth may grow. This is normally an indication of congestion in the outbound link. In order to protect the queue from overflowing during periods of severe congestion, packets may be probabilistically discarded based on the current queue depth or packet marking. This operation is called queue congestion management and such algorithms are well known to those skilled in the art.

Finally, the queue is serviced in accordance with a particular queue service discipline (such as strict priority, weighted fair or weighted priority). The servicing rate is configurable. In addition to work-conserving queue scheduling disciplines, the queue output can be shaped (a non-work conserving discipline) in a manner in which a queue will only transmit a packet if sufficient time has elapsed since it's last transmission (this is known as packet shaping). As mentioned previously, these traffic management functions are used to control the bandwidth, delay, jitter and loss probability attributes or characteristics experienced by the service.

Some of these traffic management functions are applied on subscriber ingress, such as traffic rate policing, and some are on subscriber egress, such as traffic rate shaping. In some instances, the Traffic Manager is also responsible for loading new filter rules into the 5-tuple identifier/classifier to identify the flow to be handled. In other instances, a higher-level in the classification hierarchy may load new filter rules into a lower layer of the hierarchy.

As illustrated by the generalized compute resource block 506, various aspects of the traffic management and classification operations are performed using generalized compute resources. As described below in detail, in one embodiment the generalized compute resources comprise compute nodes that are distributed across the network element line cards and allocated on a per subscriber flow/application basis. Accordingly, generalized compute resource block 506 is schematically depicted to have access to subscriber data stored in a Subscriber database 508, and traffic management data stored in a Traffic Management database 510. As with the generalized compute resources, in one embodiment each of Subscriber database 508 and Traffic Management database 510 are implemented as distributed databases, as described below.

Each Traffic Management entity implements a finite number of traffic management functions (i.e. a fixed number of queues, Policers and shapers). One purpose of the Traffic Manager is to dynamically allocate and manage these fixed number of these TM resources to the instantaneous network service load and requests. shared Depending on the current service mix, it may be possible for the traffic Manager to re-allocate TM resources and hence bandwidth (and/or delay) from lower priority services to higher priority services. Consider an example of a best effort service (such peer-to-peer traffic) and a service requiring specific qualitative guarantees (such as VoIP or streaming video). If insufficient excess bandwidth were available for the higher-priority service, bandwidth could be expropriated from the best effort service and combined with the excess link bandwidth to satisfy the higher priority service requirements. The expropriation can be of the form of lowering the priority of the best effort, or more active techniques such as packet rate limiting forcing packet discard and hence end-to-end rate control mechanisms (i.e. TCP) to be exercised. This is a case where the TM parameters of an existing lower priority flow would be modified based on new service requests.

In the limit, the Traffic Manager could expropriate excess bandwidth from lower priority services from other subscribers, if the customer-facing link was shared and statistically multiplexed. Once the flow terminates (e.g. the calling parties hang up, or the video completes), the TM resources are returned to the shared pool to be used for another requested service or returned to the original flows that were forced to contribute their bandwidth to support the higher priority service.

Since the number of TM functions is fixed, the Traffic Manager must handle the condition where a newly requested service may not be accepted due to resource exhaustion. In the case where the customer facing interface bandwidth is exhausted, the Traffic Manager must simply deny the service, or map the service to the best effort service category, in which case quality guarantees can not be made. In the situation where the TM resources are exhausted themselves, the Traffic Manager has the option to combine like services into service aggregates. Consider two VoIP calls in progress, each having their own TM elements, including queues, Policers, and shapers. Each VoIP call consumes approximately 64kbit/second and can be rate-limited to that amount. If another service is requested, for example a streaming video service, but no spare queues exist, the Traffic Manager may combine the two VoIP calls into a single 128Kbit/second aggregate queue. Since the constitute flows are limited to 64kbits/second, the amount of interference between the VoIP calls is low, but potentially impacting delay and jitter. If the amount of aggregation is kept low, then the impact will not be service affecting. The freed queue is now available for the newly requested streaming video service.

The Traffic Manager manages the finite TM resources and, if necessary, combines like services into service aggregates for the traffic management entities. The Traffic Manager ensures that aggregation is kept to a minimum to minimize the potential impact on service quality. In the case of a service aggregate, the TM resources are re-configured when constitute flows terminate, and the TM resources are returned to the shared pool once the last constitute flow terminates.

Since many protocols are full duplex in nature (both parties sending protocols messages back and forth to establish a link), the classification hierarchy may need to install further filter rules and traffic management elements in all four possible locations (subscriber facing/trunk facing, ingress/egress). The Traffic Manager maintains current resource allocations for each of these locations.

As can be seen from the aforementioned description, traffic management functions consist of a number of highly configurable processing steps and algorithms. The traffic management database contains parameter values and configuration information specific to a subscriber's service, allowing the dynamic configuration of traffic management functions. By treating the traffic management entities as a pool of resources that can be dynamically allocated and managed, a far greater number of services and subscribers can be supported using conventional TM techniques and implementation technology, while still ensuring service quality guarantees are respected.

Exemplary Implementation Environments

Figure 6:
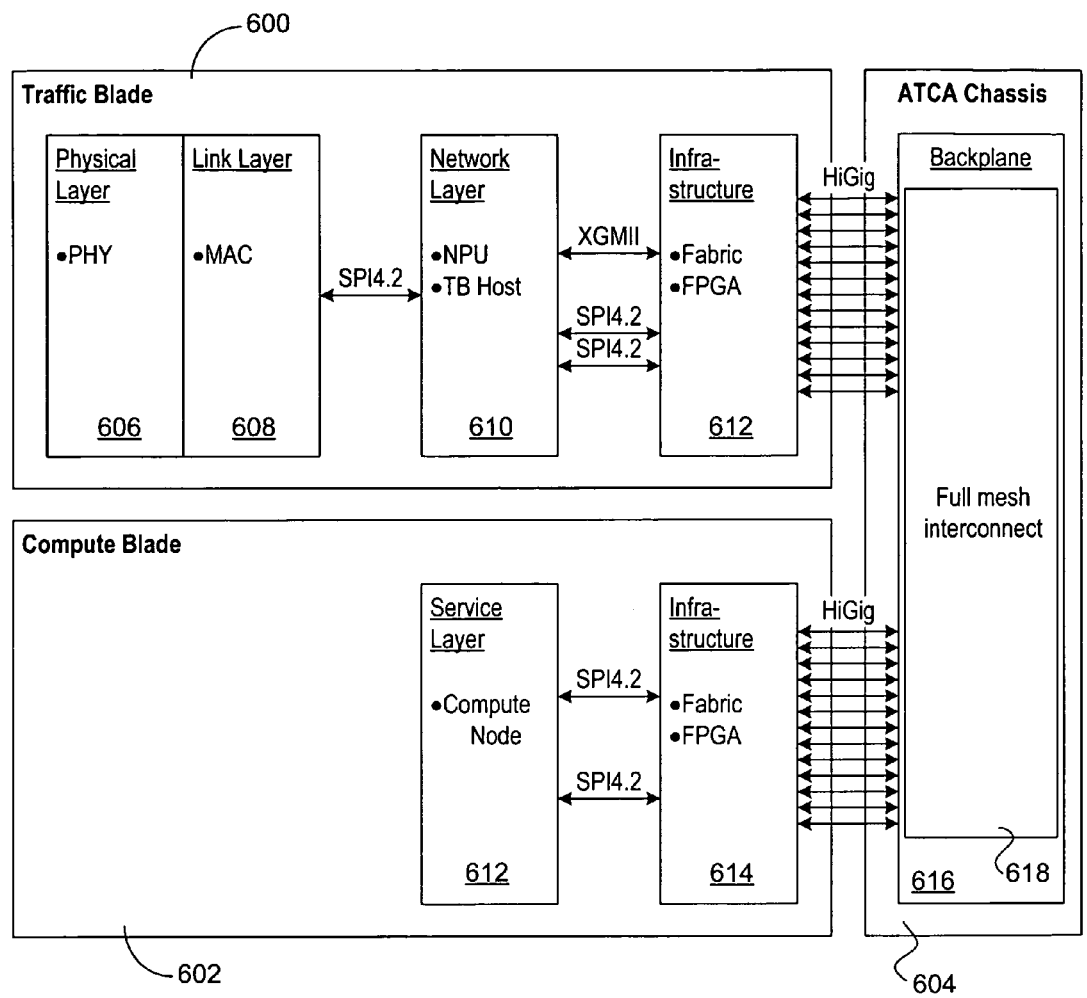
FIG. 6 is a schematic diagram illustrating the communication interconnected between a Traffic Blade and a Compute Blade.

FIGS. 6-11 illustrate exemplary network element component and system-level architectures that may be used for a variety of purposes, including but not limited to, aspects of the Service Node network element described above. In accordance with architecture aspects of some embodiment, the aforementioned functions are facilitated by various processing and storage resources hosted by associated line cards and the like, which are mounted in a common chassis. As shown in FIG. 6, from a datapath perspective, the hardware architecture of one embodiment of a Service Node can be decomposed into three entities, Traffic Blades (TB) 600, Compute Blades (CB) 602 and the chassis 604. A TB 600 can be further reduced to its physical and link layer portions 606 and 608, network layer components 610, and infrastructure components 612. Similarly, a CB 602 provides Service Layer termination 612 and infrastructure components 614. In one embodiment, a CB can be further re-defined to be an OAMP Blade based on its slot index (within chassis 604). OAMP blades are a functional superset of CBs, adding operations, administration, maintenance and provisioning functionality (collectively referred to as OAMP card function or OAMP CF).

As illustrated in the embodiments herein, chassis 604 comprises an Advanced Telecommunication and Computing Architecture (ATCA or AdvancedTCA®) chassis. The ATCA Chassis provides physical connectivity between the blades via a passive backplane 616 including a full-mesh backplane 616. It is noted that the ATCA environment depicted herein is merely illustrative of one modular board environment in which the principles and teachings of the embodiments of the invention described herein may be applied. In general, similar configurations may be deployed for other standardized and proprietary board environments, including but not limited to blade server environments.

The ATCA 3.0 base specification (approved Dec. 30, 2002), which is being carried out by the PCI Industrial Computer Manufacturers Group (PICMG), defines the physical and electrical characteristics of an off-the-shelf, modular chassis based on switch fabric connections between hot-swappable blades. (As used herein, the terms "board," "blade," and "card," are interchangeable.) This specification defines the frame (rack) and shelf (chassis) form factors, core backplane fabric connectivity, power, cooling, management interfaces, and the electromechanical specification of the ATCA-compliant boards. The electromechanical specification is based on the existing IEC60297 EuroCard form factor, and enables equipment from different vendors to be incorporated in a modular fashion with guaranteed interoperability. The ATCA 3.0 base specification also defmes a power budget of 200 Watts (W) per board, enabling high performance servers with multi-processor architectures and multi gigabytes of on-board memory.

In addition to power input to ATCA boards, mating connectors on the boards and backplane are employed for coupling input/output (I/O) signals. Many of the ATCA boards, as well as other modular boards used for telecommunications and computer, such as but not limited to CompactPCI, employ very-high speed I/O channels. For example, Advanced Switching (AS) employs a serial communication channel operating at Gigahertz+ frequencies. ATCA boards may also provide one or more I/O ports on their front panels, enabling an ATCA board to be coupled to other network resources.

Figure 7:
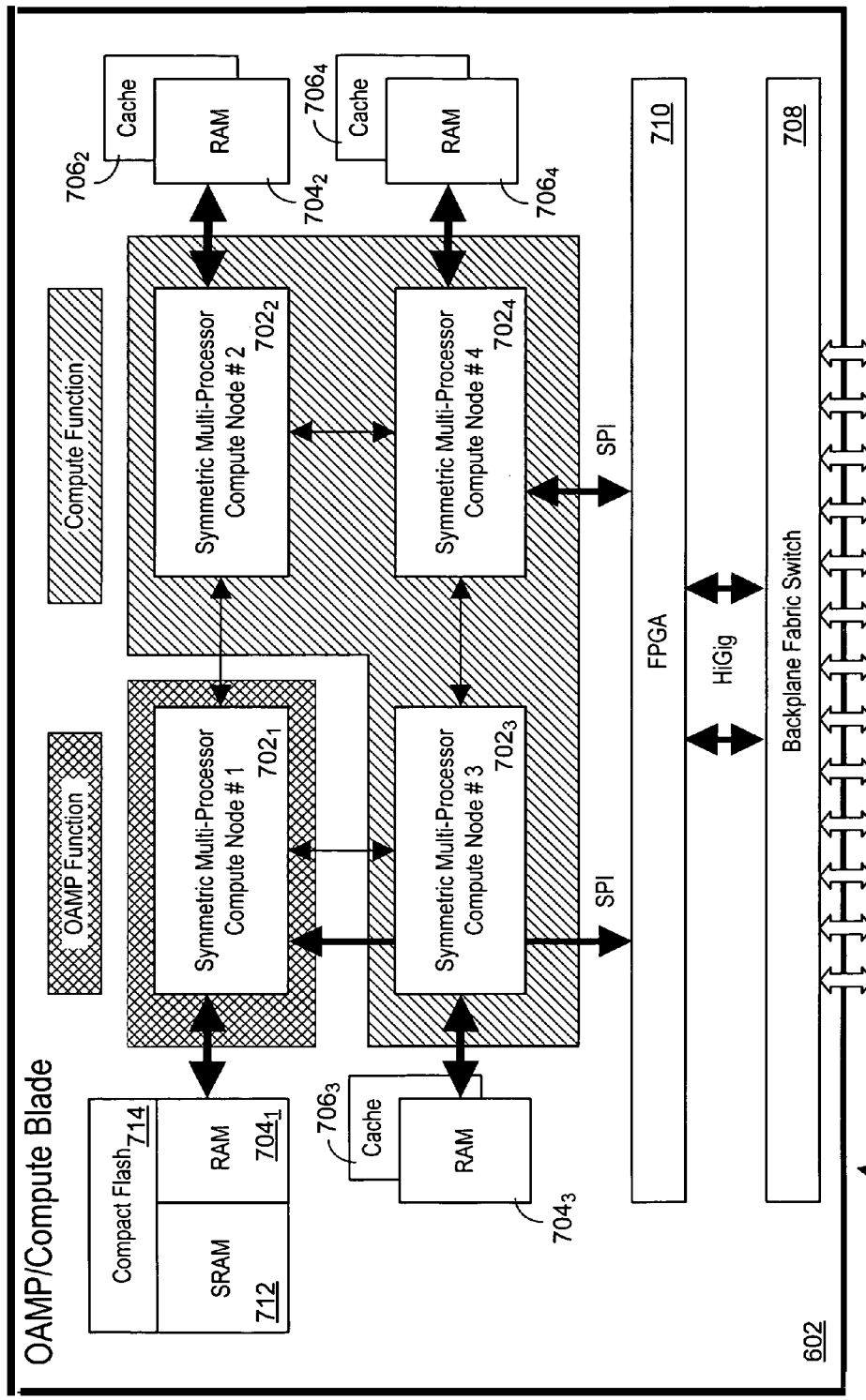
FIG. 7 is a schematic diagram illustrating of one embodiment of a Compute Blade that is provisioned for an OAMP function.

An exemplary architecture 700 for a compute blade 602 is shown in FIG. 7. In one embodiment, a single compute blade (physical) architecture is employed for both Compute Blades and OAMP CF's. More particularly, under architecture 700, a corresponding blade may be deployed to support both Compute Blade and OAMP functionality.

Compute Blade 602 employs four multiple processor compute nodes $702_{1-4}$. In general, each of compute nodes $702_{1-4}$ functions as multiple processor resources, with each processor resource being associated with a logical processor. Accordingly, such processor resources may be implemented using separate processors, or processor chips employing multiple processor cores. For example, in the illustrated embodiment of FIG. 7, each of compute nodes $702_{1-4}$ is implemented via an associated symmetric multi-core processor. Exemplary multi-core processors that may be implemented include, but are not limited to Broadcom 1480 and 1280 devices. Each of the compute nodes $702_{1-4}$ is enabled to communicate with other compute nodes via an appropriate interface (e.g., bus or serial-based interfaces). For the Broadcom 1480 and 1280 devices, this interface comprises a "Hyper Transport" (HT) interface. Other native (standard or proprietary) interfaces between processors may also be employed.

As further depicted in architecture 700, each compute nodes $702_{1-4}$ is allocated various memory resources, including respective RAM 70414. Under various implementations, each of compute nodes $702_{1-4}$ may also be allocated an external cache 70614, or may provide one or more levels of cache on-chip. In one embodiment, the RAM comprises ECC (Error Correction Code) RAM. In one embodiment, each compute node employs a NUMA (Non-Uniform Memory Access) cache coherency scheme. Other cache coherency schemes, such as MESI (Modified, Exclusive, Shared, Invalidated), may also be implemented for other embodiments.

Each Compute Blade 602 includes a means for interfacing with ATCA mesh interconnect 618. In the illustrated embodiment of FIG. 7, this is facilitated by a Backplane Fabric Switch 708. Meanwhile, a field programmable gate array (FPGA) 710 containing appropriate programmed logic is used as an intermediary component to enable each of compute nodes $702_{1-4}$ to access backplane fabric switch 708 using native interfaces for each of the compute nodes and the fabric switch. In the illustrated embodiment, the interface between each of compute nodes $702_{1-4}$ and the FPGA 710 comprises an SPI (System Packet Interface) 4.2 interface, while the interface between the FPGA and backplane fabric switch 708 comprises a Broadcom HiGig™ interface. It is noted that these interfaces are merely exemplary, and that other interface may be employed depending on the native interfaces of the various blade components.

In addition to local RAM (e.g., RAM $704_1$), the compute node associated with the OAMP function (depicted in FIG. 7 as Compute Node #1) is provided with local SRAM 712 and a non-volatile store (depicted as Compact flash 714). The non-volatile store is used to store persistent data used for the OAMP function, such as provisioning information and logs. In Compute Blades that do not support the OAMP function, each compute node is provided with local RAM and a local cache, as depicted in FIG. 11.

In the embodiment illustrated in FIG. 7, compute blade 602 is provisioned as an OAMP blade. In one configuration (as shown), one of the compute nodes is employed for performing OAMP functions (e.g., compute node $702_1$), while the other three compute nodes (e.g., compute nodes $702_{2-4}$) perform normal compute functions associated with compute blades, as described in further detail below. When a compute blade 602 is provisioned as a compute blade, each of compute nodes $702_{1-4}$ is available for performing the compute functions described herein.

Figure 8:
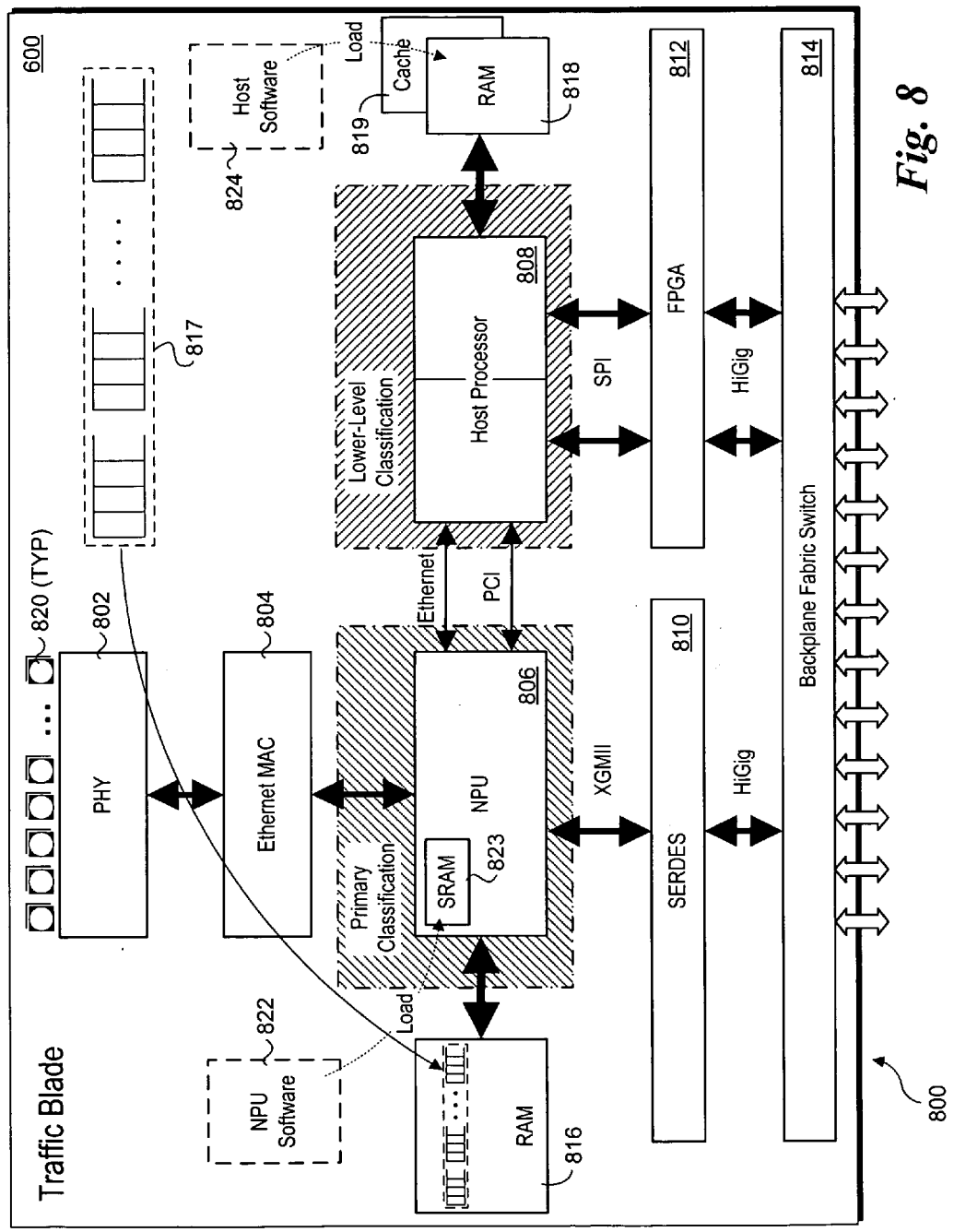
FIG. 8 is a schematic diagram illustrating one embodiment of a Traffic Blade.

FIG. 8 shows an exemplary architecture 800 for a traffic blade 600. Architecture 800 includes a PHY block 802, an Ethernet MAC block 804, a network processor unit (NPU) 806, a host processor 808, a SERDES interface 810, an FPGA 812, a backplane fabric switch 814, RAM 816 and 818 and cache 819. The traffic blade further includes one or more I/O ports 820, which are operatively coupled to PHY block 820. Depending on the particular use, the number of I/O ports may vary from 1 to N ports. For example, under one traffic blade type a 10×1 Gigabit Ethernet (GigE) port configuration is provided, while for another type a 1×10 GigE port configuration is provided. Other port number and speed combinations may also be employed.

PHY block 802 and Ethernet MAC block 804 respectively perform layer 1 (Physical) and layer 2 (Data Link) functions, which are well-known in the art. In general, the PHY and Ethernet MAC functions may be implemented in hardware via separate components or a single component, or may be implemented in a combination of hardware and software via an embedded processor or the like.

One of the operations performed by a traffic blade is packet identification/classification. As discussed above, a multi-level classification hierarchy scheme is implemented for this purpose. Typically, a first level of classification, such as the aforementioned 5-Tuple signature classification scheme, is performed by the traffic blade's NPU 806. Additional classification operations in the classification hierarchy that may be required to fully classify a packet (e.g., identify an application flow type) in the manner discussed above. In general, these higher-level classification operations may be performed by the traffic blade's host processor 808 and/or a processor on a compute blade, depending on the particular classification.

Another operation performed by NPU 806 are queue-related operations. Generally, NPU 806 manages access to a set of queues 817 that are stored in its local RAM 816. As described below in further detail, the various sets of queues for the Traffic Blades are aggregated to form shared queue resource pool 308 and managed via distributed software components on a shared basis.

NPU 806 includes various interfaces for communicating with other board components. These include an Ethernet MAC interface, a memory controller (not shown) to access RAM 816, Ethernet and PCI interfaces to communicate with host processor 808, and an XGMII interface. SERDES interface 810 provides the interface between XGMII interface signals and HiGig signals, thus enabling NPU 806 to communicate with backplane fabric switch 814. NPU 806 may also provide additional interfaces to interface with other components, such as an SRAM (Static Random Access Memory) interface unit to interface with off-chip SRAM (both not shown).

Similarly, host processor 808 includes various interfaces for communicating with other board components. These include the aforementioned Ethernet and PCI interfaces to communicate with NPU 806, a memory controller (on-chip or off-chip - not shown) to access RAM 818, and a pair of SPI 4.2 interfaces. FPGA 812 is employed to as an interface between the SPI 4.2 interface signals and the HiGig interface signals.

Typically, NPUs are designed for performing particular tasks in a very efficient manner. These tasks include packet forwarding and packet classification, among other tasks related to packet processing. To support such functionality, NPU 806 executes corresponding NPU software 822. This software is shown in dashed outline to indicate that the software may be stored (persist) on a given traffic blade (e.g., in a flash device or the like), or may be downloaded from an external (to the traffic blade) store during initialization operations, as described below. During run-time execution, NPU software 822 is loaded into internal SRAM 823 provided by NPU 806.

Host processor 808 is employed for various purposes, including lower-level (in the hierarchy) packet classification, gathering and correlation of flow statistics, and application of traffic profiles. Host processor 808 may also be employed for other purposes. In general, host processor 808 will comprise a general-purpose processor or the like, and may include one or more compute cores (as illustrated, in one embodiment a two-core processor is used). As with NPU 806, the functionality performed by host processor is effected via execution of corresponding software (e.g., machine code and or virtual machine byte code), which is depicted as host software 824. As before, this software may already reside on a traffic blade, or be loaded during blade initialization.

In one embodiment, host processor 808 is responsible for initializing and configuring NPU 806. Under one initialization scheme, host processor 808 performs network booting via the DHCP (or BOOTP) protocol. During the network boot process, an operating system is loaded into RAM 818 and is booted. The host processor then configures and initializes NPU 806 via the PCI interface. Once initialized, NPU 806 may execute NPU software 822 on a run-time basis, without the need or use of an operating system.

Figure 9:
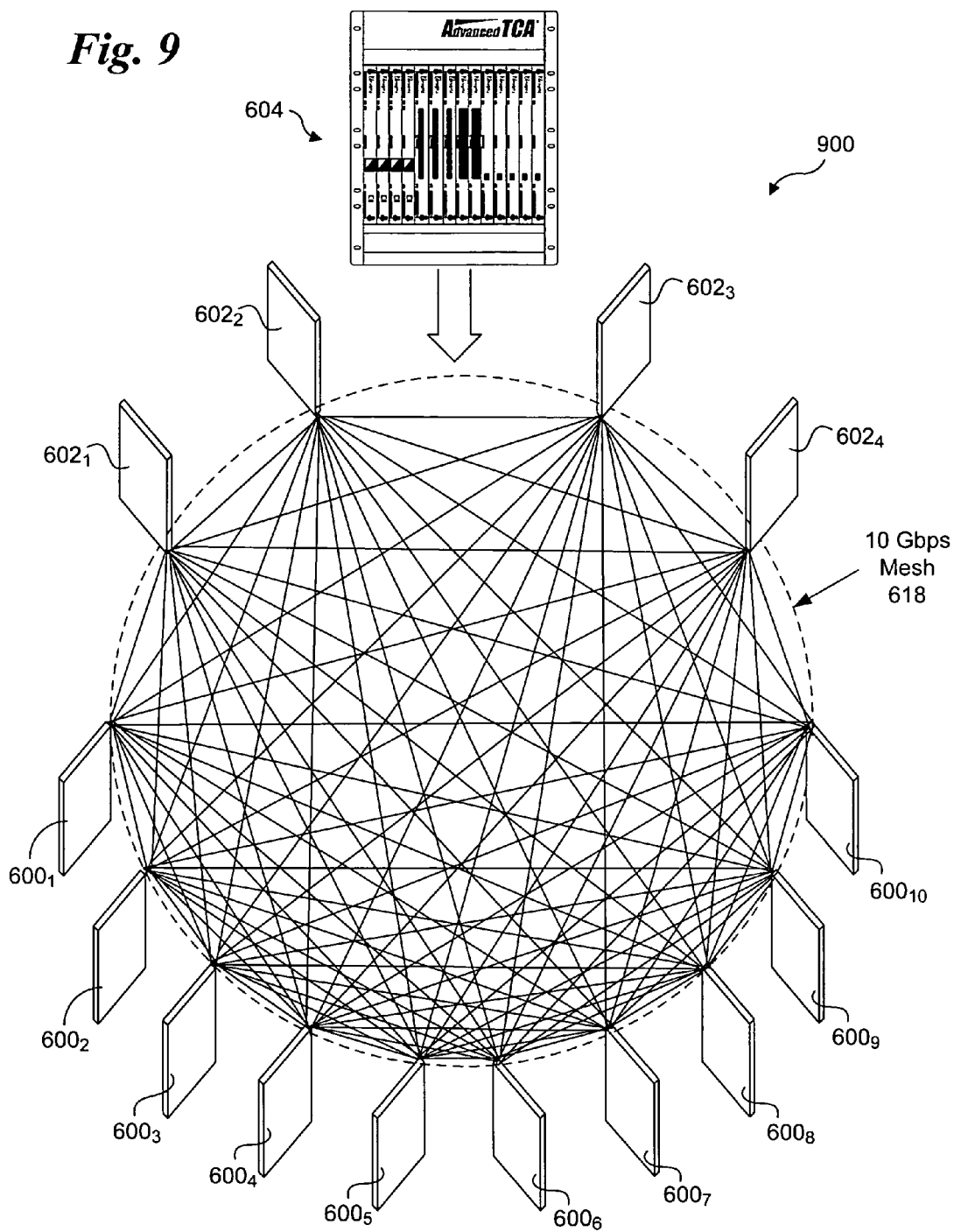
FIG. 9 is a schematic diagram illustrating one configuration of a service node implemented via a ATCA chassis.

FIG. 9 is a schematic diagram illustrating the cross-connectivity provided by the ATCA backplane mesh interconnect used in one embodiment of the Service Node. In the exemplary configuration 900 shown in FIG. 9, an ATCA chassis 604 is fully populated with 14 ATCA blades, with each blade installed in a respective chassis slot—in an actual implementation, the chassis may be populated with less blades or may include other types of blades in addition to compute and traffic blades. The illustrated configuration includes four compute blades $602_{1-4}$, and 10 traffic blades $600_{1-10}$, with one of the compute blades being provisioned to provide OAMP functions. As depicted by the interconnection mesh, each blade is communicatively-coupled with every other blade under the control of fabric switching operations performed by each blade's fabric switch. In one embodiment, mesh interconnect 618 provides a 10 Gbps connection between each pair of blades, with an aggregate bandwidth of 280 Gbps.

Another software aspect of the system pertains to the use of a Service Management Engine (SME). The SME provides key added value over and above that of a traditional network element such as a BRAS and Edge-Router. A traditional BRAS/Edge-Router is able to manage subscribers' traffic on a per session basis. A Service Node, equipped with the SME, provides visibility into subscriber sessions, and enable traffic management on a per-application level. In addition, it is able to provide customized, network-based, and subscriber-aware application services.

The SME provides these functionalities through flow classification, deep packet inspection, flow level traffic management, and application service scripting. When subscriber traffic enters a Service Node, it is separated into flows. The flows are classified by their application-level protocols with the aid of deep packet inspection. Some of these flows are traffic-managed according to the authorization of the subscriber to which they belong. This management typically includes policing, shaping and prioritization on a per-flow basis. Other flows are bifurcated or diverted to application service scripts that implement various customized services.

As discussed above, the SME builds on the subscriber management functions of a BRAS, and extends traffic management to a per-subscriber/per-application level. It also exposes some of these functions in a generic state machine so that customized applications may be built on top of these. The service management engine software is the top most functional layer in the system. It uses features provided by the lower layers; it guarantees certain level of quality of service for services and applications under management; and it provides visibility into the traffic stream for the network operators.

The Service Management Engine is the runtime layer of a Services Management Software Environment. It may be divided into three major functional areas: Bandwidth Management, Service Management, and Application Scripting. The Bandwidth Management area is concerned with per-subscriber/per-service traffic management; the Service Management area is concerned with classifying flows and following protocol negotiations; and the Application Scripting area is concerned with providing capability to script custom network-based application services.

Figure 10:
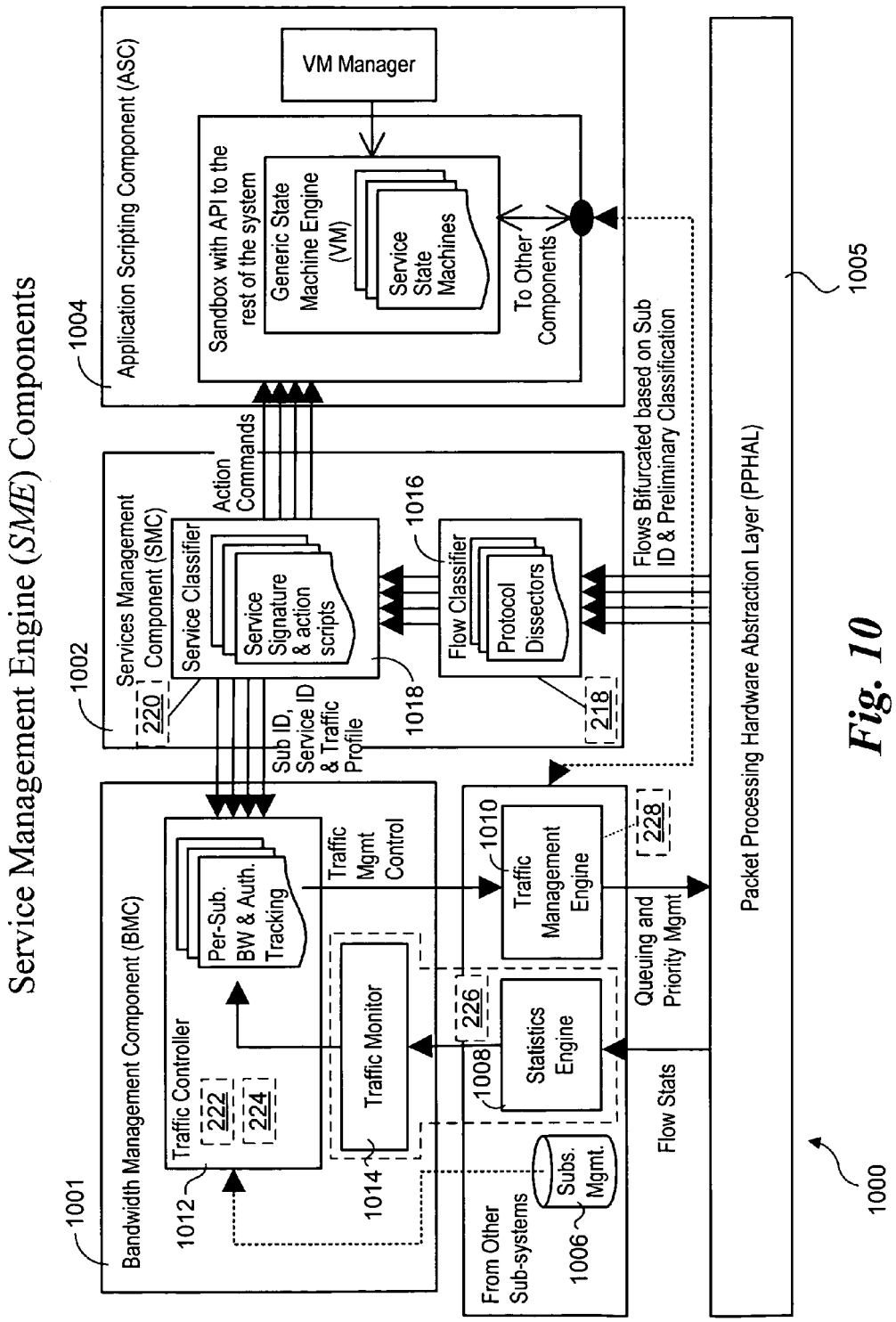
FIG. 10 is a schematic diagram illustrating various components associated with a Service Management Engine (SME)

FIG. 10 shows the major components of the SME, and their interactions. Some components are shown in more detail, while external components such as subscriber management, traffic management, and the global arbitrator are not shown for clarity. FIG. 10 also does not show the internal layering of the components for simplicity.

The SME consists of three major abstract components: Bandwidth Management component (BMC) 1001, a Services Management component (SMC) 1002, and an Application Scripting Component (ASC) 1004. The BMC 1001 is responsible for tracking per-subscriber usage statistic and traffic authorization and admission. The SMC 1002 is responsible for classification of flows, dissection of packets, and correlation of flows to services. The ASC 1004 runs sandboxes in which scripts may be executed. Each of the BMC, SMC, and ASC interface to a Packet Processing Hardware Abstraction Layer 1005.

The Bandwidth Management Component 1001 depends on a Subscriber Management Subsystem (SMS) (which provides subscriber information 1006), a Statistics Engine 1008, as well as a Traffic Management Engine (TME) 1010 for operation. The BMC receives correlated traffic and flow statistics on a per-subscriber and per-port/circuit basis from Statistics Engine 1008. It runs a per-subscriber state machine that keeps track of subscriber authorization, bandwidth consumption, and service utilization. It also receives service classification information from Service Management Component 1002, and computes traffic management policies on a per-flow basis. These policies are then sent to the TME 1010 for execution. To facilitate these operations, BMC 1001 includes a Bandwidth Controller 1012, and a Traffic Monitor 1014.

As shown by the reference numerals in the dash blocks, the SME components are mapped to various functional blocks/processes in FIG. 2. With respect to the BMC components, Traffic Controller 1012 performs Subscriber Classification 222 and Authentication 224, Traffic Management Engine 1010 facilitates Traffic Manager 228, while the operations for Bandwidth Manager 226 are performed via Traffic Monitor 1014 and Statistics Engine 1008.

The Services Management Component 1002, on the other hand, supplies the protocol and service classification information to Bandwidth Management Component 1001. It receives pre-classified packet flows that are bifurcated from the ingress traffic blade; it classifies each flow by their application level protocol; it dissects packets from interested flows in order to get application level messages; finally, it correlates flows to services, and sends the service classification and traffic specification of flows to BMC and other interested listeners. These operations are facilitated by a Flow Classifier 1016 and a Service Classifier 1018, which respectively perform Protocol Classification 218 and Service Classification 220.

The Application Scripting Component 1004 implements a sandbox where "application scripts" may be executed in virtual machines. This component provides an API and an execution environment similar to what is available to the Bandwidth Management Component. In addition, Service Definition Scripts may direct specific messages to a particular application script. Application Scripts may implement custom application state machines, or security and traffic management policies. Each script has its dedicated environment.

Subscriber provisioning is handled at the subscriber management system, the detail of which is beyond the scope of this specification. In one embodiment, each subscriber is provisioned with a list of services; and each service is tagged with a service class: Best Effort, Managed, or Preferred. After subscribers are authenticated, their lists are brought to the network element as part of the authorization process. Each subscriber will be assigned to a compute-node, and the authorization will be made available to the Bandwidth Management Component residing on that compute node.

Profiles of services are provisioned at the management layer of SMC 1002. They are provisioned in the form of Service Definition Scripts. A Service Definition specifies what protocols a service uses, how a service is matched, what values are expected in the service's control protocol negotiations, the traffic profile of the data streams, and the control actions to be taken when this services is detected. These profiles are stored in a Service Node's persistent file system. The SMC uses these profiles to match flows to services, and obtain their traffic profiles, which are delivered to the BMC 1001. Similarly, Application Scripts are provisioned at the management layer of ASC 1004. They are stored in a Service Node's persistent file system, and are loaded into their sandboxes at startup time.

As discussed above, the Service Node platform architecture employs a substantial level of parallelism, as provided by multiple Compute and Traffic Blades. External entities, such as subscriber provisioning and, the Statistics Engine 1008, and the Traffic Management Engine 1010 are run in their own processes. The SME spreads itself along component boundaries. The Bandwidth Management Component will have its own process; so is the Service Management Component. The Application Scripting component will have a sandbox process from which all application scripts run.

Each compute-node that is not reserved for OAMP functions will have a full set of SME processes, including one BMC process, one SMC process, and one ASC process. Each of these processes is also multithreaded in one embodiment. A compute-node is responsible for a number of subscribers. All processing, analysis and computation done for, or on behalf of, these subscribers are conducted on this compute-node.

In addition to these processes that run on compute-nodes, the Service Management Component offloads some of its tasks, such as IP reassembly and preliminary (i.e., lower-level (s) of) classification, to a process on the host processor on Traffic Blades 600. This process may run these tasks directly, or act as a proxy for the ASIC/FPGA array. Moreover, SME has a configuration management (CM) process that implements the management layer functions.

In order to better understand aspects of the packet processing techniques discussed herein, an exemplary Service Node environment is shown in FIG. 11. As discussed above with reference to FIG. 9, this environment employs a fully-populated ATCA chassis including 10 Traffic Blades $600_{1-10}$, and 4 Compute Blades $602_{1-4}$, with Compute Blade $602_1$ being provisioned as to support OAMP functions. Each of the Traffic and Compute Blades are communicatively-coupled via mesh interconnect 618 (see FIG. 17), with access to the interconnect being managed by the backplane fabric switch on each blade.

In general, various SME component instances will be run on the various blades. For simplicity and clarity, these SME component instances are schematically depicted as SME instances $1100_{1-3}$. It will be understood that the actual SME component instances will include instances of SME components applicable to the respective execution host (i.e., each of the Traffic Blades $600_{1-10}$ and Compute Blades $602_{1-4}$ will run instances of associated SME components).

As shown in FIG. 16, local instances of Traffic Management database 510 are distributed across the various blades in the Service Node, such that the SME components hosted by each applicable blade are provided access to Traffic Management data. Various changes to the local instances of Traffic Management database 510 are propagated across the Service Node on an on-going basis to effect a virtual database, as depicted by the TM database 510v in dashed lines.

As further illustrated in FIG. 16, the various queue sets $817_{1-10}$ stored in RAM 816 on the various Traffic Blades $600_{1-10}$ are managed as respective segments of shared queue resource pool 308. Information concerning the use and availability of the various queues in the shared pool is maintained in Traffic Management database 510, such that each local traffic management component is provided with information concerning the queue resources.

As discussed above, the various resources that are employed for handling a given flow may be (generally)

located anywhere within the Service Node, thus supporting various capabilities, such as full scalability and failover. Specific resources are assigned for handling particular flows based on the subscriber and possibly other considerations, such as application (e.g., VoIP, VoD, etc.). Moreover, these specific resources may be allocated from a shared pool of resources (e.g., shared queue resource pool 308) using the dynamic allocation schemes described herein, enabling the Service Node to adapt its resource usage in view of on-going real-time traffic considerations.

The Service Node of the present invention provides significant advantages over the prior art network elements, including BRAS and edge routers. Dynamic allocation of queues and traffic management functions from a shared resource provides for statistical multiplexing of queues, allowing the support of more subscribers with a fewer number of queues than static allocation can support.

The Service Node also performs additional novel and enhanced operations to support new and/or improved services. These include determining the traffic management parameters dynamically, in response to receiving traffic indicating a particular service initiation, the current state of the network (available bandwidth, congestion etc), the current state of the subscriber link (available bandwidth, congestion etc) and other services the subscriber currently has active. Employing a combination of 5-tuple classification and other techniques into a classification hierarchy to identify subscribers and services, thus eliminating the need for provisioned or layer 2 schemes to identify traffic types. Employing the use of 5-tuple and lexical parsing techniques to identify applications that may be concealed due to Network Address Translation (NAT) or firewalling functions. Additionally, employing the combination of 5-tuple and other classification techniques to identify subscribers and services solves the home router-gateway problem of concealing services/applications.

Other advantages are also provided. Using packet bifurcation to forward a duplicate for secondary processing allows for arbitrarily complex protocol analysis without being traffic impacting. The use of packet sub-sampling allows increasingly complex classification algorithms at subsequent layers of the classification hierarchy while maintaining performance targets. Dynamically installing new filter rules into lower levels of the classification hierarchy reduces the number of extraneous packets processed that need to be processed. Moreover, the use of classification and traffic management to identify the termination of service and restore the queue and traffic management functions to the shared resource pool for use by other subscribers and/or services supports tailored use of NE resources in a manner that is not available using known static provisioning schemes.

As discussed above, various operations performed by the Service Node are implemented via execution of software (e.g., machine instructions and/or virtual machine code) on processing elements. Thus, embodiments of this invention may be used as or to support software embodied as programs, modules, libraries, etc., executed upon some form of processing core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
performing a first level of classification on packets flowing as traffic through a primary datapath of a network element;
performing a second level of classification on duplicates of a subset of the packets, the second level of classification executed within a bifurcated datapath of the network element external to the primary datapath, wherein processing of the duplicate packets enables protocol analysis without impacting traffic flow in the primary datapath;
maintaining shared pools of traffic management resources on the network element;
dynamically allocating traffic management resources from the shared pools to facilitate transport of respective subscriber flows across the network element, wherein the traffic management resources are dynamically allocated based at least in part on the first and second levels of classification;
applying traffic management policies on a per-subscriber flow basis using the traffic management resources allocated to that subscriber flow;
applying the traffic management policies to dynamically combine like subscriber service flows into aggregate, higher-bandwidth queues to free queues from the shared pool of traffic management resources for allocation to additional subscriber service flows;
determining when a subscriber service flow is terminated;
releasing the traffic management resources that were allocated for a terminated subscriber service flow; and
applying the traffic management policies to dynamically re-allocate traffic management resources by separating the aggregate, higher-bandwidth queues into lower-bandwidth queues when the shared pool of traffic management resources has queue availability.

2. The method of claim 1, further comprising:
monitoring traffic management parameters; and
adjusting traffic management policies applied to subscriber flows in response to detecting a change in the traffic management parameters.

3. The method of claim 1, further comprising:
determining an application associated with a subscriber flow; and
applying an application-based traffic management policy to the subscriber flow based on the application associated with the subscriber flow.

4. The method of claim 1, further comprising:
performing an N-tuple signature match to perform the first level of classification; and performing deep packet inspection to perform the second level of classification.

5. The method of claim 4, wherein the N-tuple signature match is performed using a first processing element, and the deep packet inspection is performed using a second processing element.

6. The method of claim 1, further comprising:
receiving a first portion of packets corresponding to a unclassified subscriber flow;
employing an N-tuple signature match filter to filter the first portion of packets to effect a first filter function;
employing deep packet inspection associated with the first filter function to effect a second filter function;
classifying the subscriber flow via the first and second filter functions;
updating a signature employed by the N-tuple signature match filter to associate packets having a matching N-tuple signature with the subscriber flow; and
employing the N-tuple signature match filter to classify a subsequent portion of packets associated with the subscriber flow.

7. The method of claim 1, wherein the network element comprises a modular chassis including a plurality of traffic blades and compute blades, the method further comprising:
receiving packets at an ingress traffic blade;
performing classification of the packets to identify a subscriber flow associated with the packets; and
based on the subscriber flow,
identifying an egress traffic blade to be employed for egress traffic flow operations and sending a first copy of the packets to that egress traffic blade; and
sending a second copy of the packets to one of a compute resource on the ingress traffic blade or a compute blade.

8. The method of claim 7, further comprising:
detecting initiation of a subscriber session;
classifying packets associated with the subscriber session to a subscriber flow; and
allocating traffic blade traffic management resources for the subscriber flow.

9. The method of claim 1, further comprising
statistically multiplexing allocation of traffic management queues, each traffic management queue associated with a subscriber and service corresponding to a respective subscriber flow.

10. The method of claim 1, further comprising:
performing sub-sampling of packets associated with a subscriber flow, the subscriber flow being identified via a first level of classification;
performing at least a second level of classification on the sub-sampling of packets; and
modifying traffic management operations corresponding to the subscriber flow in view of information obtained via the at least a second level of classification.

11. The method of claim 1, further comprising:
implementing a multi-level classification hierarchy mechanism to classify packets into subscriber flows.

12. The method of claim 11, wherein the multi-level classification hierarchy mechanism classifies subscribers flows based on identification of a subscriber and an application.

13. The method of claim 11, wherein the multi-level classification hierarchy mechanisms comprises:
a first-level filtering mechanism implemented at line rate;
a packet bifurcation mechanism to bifurcate processing of at least a portion of packets classified by the first-level filtering mechanism to a second-level filtering mechanism,
wherein the packet bifurcation mechanisms introduces no jitter or delay in processing of the first-level filtering mechanism.

14. The method of claim 11, further comprising installing new filter rules into lower levels of the classification hierarchy in response to subscriber flow classification information derived for the multi-level classification hierarchy mechanism.

15. An apparatus, comprising:
a chassis having a plurality of slots and including a mesh interconnect between the slots;
a plurality of traffic blades, each installed in the chassis in a respective slot and including interface coupled to the mesh interconnect, the plurality of traffic blades including ingress traffic blades and egress traffic blades;
a plurality of compute blades, each installed in the chassis in a respective slot and including an interface coupled to the mesh interconnect; and
software components distributed across the plurality of traffic blades and compute blades, the software components to execute on processing elements hosted by the traffic blades and compute blades to perform operations including:
managing shared pools of traffic management resources comprising an aggregation of local traffic management resources hosted by respective traffic blades, wherein the shared pools of traffic management resources include shared pools of flow queues and traffic policers;
performing ingress processing for packets received at an ingress traffic blade, the ingress processing including performing classification of the packets to identify a subscriber flow associated with the packets;
applying traffic management policies on a per-subscriber flow basis using the traffic management resources allocated to each subscriber flow;
dynamically combining like subscriber service flows into aggregate, higher bandwidth queues to free queues from the shared pool of traffic management resources for allocation to additional subscriber service flows; and
limiting aggregation of the like subscriber service flows to maintain service quality for the aggregated like subscriber service flows.

16. The apparatus of claim 15, wherein execution of the software performs further operations comprising:
implementing a multi-level classification hierarchy mechanism to classify packets into subscriber flows.

17. The apparatus of claim 16, wherein the multi-level classification hierarchy mechanisms comprises:
a first-level filtering mechanism implemented at line rate by a network processor unit on an ingress traffic blade; and
a packet bifurcation mechanism to bifurcate processing of at least a portion of packets classified by the first-level filtering mechanism to a second-level filtering mechanism,
wherein the second-level filtering mechanism is implemented via execution of a portion of the distributed software on a host processor for the ingress traffic blade.

18. The apparatus of claim 15, wherein execution of the software performs further operations comprising:
statistically multiplexing allocation of traffic management queues, each traffic management queue associated with a subscriber and service corresponding to a respective subscriber flow.

19. The apparatus of claim 15, wherein execution of the software performs further operations comprising:
classifying a subscriber flow by,
performing a first level of classification on packets corresponding to the subscriber flow;
performing at least a second level of classification on at least a portion of the packets; and
allocating traffic management resources based on classification of the subscriber flow.

20. The apparatus of claim 15, wherein execution of the software performs further operations comprising:
performing classification of the packets to classify the subscriber flow as a particular application traffic type; and
managing egress traffic flow operations corresponding to the subscriber flow based on its application traffic type.

21. The apparatus of claim 20, wherein an ingress traffic blade includes a network processor unit (NPU) and a host processor, and wherein classification of packets into particular application traffic types is performed by:
employing the NPU to perform a first level classification using the NPU; and
employing the host processor to perform at least one additional level of classification including deep packet inspection.

22. The apparatus of claim 15, wherein execution of the software performs further operations comprising:
effecting a distributed traffic management database in which traffic management data is stored, the distributed traffic management database including local instances of the database hosted on respective traffic and compute blades;
updating a local instance of the traffic management database with traffic management data generated by its host blade; and
propagating the update to other local instances of the traffic management database hosted by other blades.

23. The apparatus of claim 15, wherein the chassis comprises an Advanced Telecommunication and Computing Architecture (ATCA) chassis.

24. A network element, comprising:
a chassis in which a plurality of line cards are installed;
means for forwarding IP datagrams received at an ingress interface using a plurality of managed traffic flows having different service levels;
means for associating IP datagrams with a subscriber flow;
means for assigning a subscriber flow to a managed traffic flow;
means for maintaining a shared pool of traffic management resources including flow queues and traffic shapers;
means for dynamically combining like subscriber service flows into aggregate, higher-bandwidth queues to free queues from the shared pool of traffic management resources for allocation to additional subscriber service flows;
means for limiting aggregation of the like subscriber service flows to maintain service quality for the aggregated like subscriber service flows;
means for dynamically re-allocating traffic management resources by separating the aggregate, higher-bandwidth queues into lower-bandwidth queues when the shared pool of traffic management resources has queue availability; and
means for dynamically allocating traffic management resources from the shared pool to a managed traffic flow,
wherein the shared pool of traffic management resources is distributed across the plurality of line cards.

25. The network element of claim 24, further comprising:
means for identifying an application associated with the subscriber flow.

26. The network element of claim 24, further comprising:
means for implementing a multi-level hierarchy classification scheme.

27. The network element of claim 24, further comprising:
means for determining when a subscriber flow has terminated; and
means for re-allocating traffic management resources allocated to the terminated subscriber flow to a new subscriber flow.

28. The apparatus of claim 15, wherein the mesh interconnected is provided by a backplane of the chassis.

29. The apparatus of claim 15, wherein the shared pools of traffic management resources further include shared pools of congestion managers and traffic shapers.

30. The method of claim 1, further comprising:
limiting aggregation of the like subscriber service flows to maintain service quality for the aggregated like subscriber service flows.

31. The apparatus of claim 15, wherein execution of the software performs further operations comprising:
dynamically re-allocating traffic management resources by separating the aggregate, higher-bandwidth queues into lower-bandwidth queues when the shared pool of traffic management resources has queue availability.

32. The apparatus of claim 15, wherein performing classification of the packets to identify the subscriber flow associated with the packets does not impact traffic flow.

* * * * *